Oct. 13, 1959 R. G. PIETY 2,908,889

COMPUTER

Filed Dec. 16. 1955 16 Sheets-Sheet 1

INVENTOR.
R.G.PIETY
BY Hudson & Young
ATTORNEYS

INVENTOR.
R. G. PIETY
BY
Hudson & Young
ATTORNEYS

Oct. 13, 1959

R. G. PIETY 2,908,889

COMPUTER

Filed Dec. 16, 1955

16 Sheets-Sheet 3

INVENTOR.
R. G. PIETY

BY Hudson & Young

ATTORNEYS

INVENTOR.
R.G. PIETY
BY Hudson & Young
ATTORNEYS

INVENTOR.
R. G. PIETY
BY Hudson & Young
ATTORNEYS

Oct. 13, 1959 R. G. PIETY 2,908,889

COMPUTER

Filed Dec. 16. 1955 16 Sheets-Sheet 6

INVENTOR.
R.G. PIETY

BY Hudson & Young

ATTORNEYS

Oct. 13, 1959 R. G. PIETY 2,908,889

COMPUTER

Filed Dec. 16, 1955 16 Sheets-Sheet 7

INVENTOR.
R. G. PIETY

BY Hudson & Young

ATTORNEYS

INVENTOR.
R. G. PIETY

BY Hudson & Young

ATTORNEYS

INVENTOR.
R.G. PIETY
BY Hudson & Young
ATTORNEYS

INVENTOR.
R. G. PIETY
BY Hudson & Young
ATTORNEYS

INVENTOR.
R. G. PIETY
BY Hudson & Young
ATTORNEYS

INVENTOR.
R. G. PIETY
BY Hudson & Young
ATTORNEYS

INVENTOR.
R. G. PIETY
BY Hudson & Young
ATTORNEYS

INVENTOR.
R. G. PIETY
BY Hudson & Young
ATTORNEYS

INVENTOR.
R. G. PIETY

BY Hudson & Young
ATTORNEYS

INVENTOR.
R. G. PIETY

BY Hudson & Young
ATTORNEYS

United States Patent Office 2,908,889

Patented Oct. 13, 1959

2,908,889

COMPUTER

Raymond G. Piety, Bartlesville, Okla., assignor to Phillips Petroleum Company, a corporation of Delaware Application December 16, 1955, Serial No. 553,626

48 Claims. (Cl. 340—15)

This invention relates to a method of and apparatus for multiplying and/or dividing algebraic polynomials. In another aspect it relates to a universal tuning system. In another aspect it relates to a tuning system for seismograph signals which can be tuned to detect a particular wave form. In still another aspect it relates to a system for obtaining true parameters from measured well logging data.

This application is a continuation-in-part of copending applications Serial No. 378,541, filed September 4, 1953, and Serial No. 496,491, filed March 24, 1955.

In various fields of physical measurement and analysis the data under consideration can be expressed in the general form of an algebraic polynomial of the type $$a_0+a_1x+a_2x^2+ \ldots +a_nx^n$$

where the coefficients $a_0, a_1, a_2 \ldots a_n$ represent the magnitude of the individual quantities under consideration and the quantities $x, x^2 \ldots x^n$ represent time, space or the like at which the respective coefficients $a_1, a_2 \ldots a_n$ are obtained with respect to a reference point associated with the coefficient $a_0$. The exponents attached to the several $x$'s serve to identify the time, space or the like at which the respective coefficients are taken. For example, an electrical voltage sine wave of $\pi$ period and unit maximum value can be expressed as follows:

$$0+0.7x+1.0x^2+0.7x^3+0x^4-0.7x^5-1.0x^6-0.7x^7+0x^8 \quad (2)$$

wherein the coefficients 0.7, 1.0, 0.7, 0, −0.7, −1.0, −0.7 and 0 represent the magnitude of voltage values at respective phase angles of $\pi/8$, $\pi/4$, $3\pi/8$, $\pi/2$, $5\pi/8$, $3\pi/4$, $7\pi/8$ and $\pi$ which in turn are represented by the respective quantities $x$, $x^2$, $x^3$, $x^4$, $x^5$, $x^6$, $x^7$ and $x^8$. By increasing the number of $x$ values within the period $\pi$ the sine curve can be expressed to any desired degree of accuracy. Obviously any other mathematical curve, the magnitude of which varies with time, can be expressed in like manner. An example wherein a physically measured quantity varies with respect to displacement occurs in well logging wherein a sonde is lowered into a bore hole to measure some property of the surrounding earth formations. In order to interpret such data the measured quantity obtained from the sonde normally is recorded as a function of the depth at which the sonde is lowered. Such a record can be expressed mathematically, for example, as follows:

$$0+1.0x+2.5x^2+2.0x^3+2.6x^4+3.0x^5+ \ldots +1.7x^n \quad (3)$$

where the coefficients 1.0, 2.5, 2.0, 2.6, 3.0 . . . 1.7 represent the measured magnitude of the selected property at uniformly increasing depths represented by the respective quantities $x$, $x^2$, $x^3$, $x^4$ . . . $x^n$. These two examples are illustrative of the fact that any information which can be expressed in the form of a mathematical curve can also be expressed as an algebraic polynomial, the degree of accuracy of such expression being limited only by the number of values selected within the range of the curve.

In accordance with the present invention, a system is provided for representing mathematical data in the form of algebraic polynomials and for performing basic mathematical operations on such polynomials, that is, the multiplication and division of one polynomial by another. This general procedure belongs to the theory of linear transformations or linear operations, and an operational calculus can be set up to describe such a system. By the use of an operational calculus certain mathematical operations or functions are carried out by first transforming the function, then operating with the corresponding operators and finally returning to the original domain by the inverse transformation. The first step is to establish a suitable transformation and the second step is to establish a table of functions and their operational transforms. In explaining such an operation it will be assumed that T represents an operation on a function $f(z)$ which converts it into a new function $r(k)$. This is expressed as $$Tf(z)=r(k) \quad (4)$$

The theory advanced herein is concerned with operators that satisfy the following conditions or postulates:

$$T1f(z)=1r(k) \text{ (1 is a constant)} \quad (5)$$

$$T[f_1(z)+f_2(z)]=r_1(k)+r_2(k) \quad (6)$$

$$Tf(z+h)=r(k+h) \quad (7)$$

where the pairs, $f_1$ and $r_1$, $f_2$ and $r_2$, in (6) satisfy (5). Conditions (5) and (6) are referred to the linearity requirements and condition (7) makes the operator an operator of the closed cycle.

In many systems of physical measurement the desired functions are empirical because they normally are obtained from reading graphs or meter scales. In order to apply the theory herein developed to the interpretation of measurements made on a physical system, it must be postulated that when a physical parameter specified by a set of numbers $z$ determines another parameter given by the numbers $f(z)$ then the set of numbers given by the instrument or measuring system $r(x)$ must satisfy conditions (5), (6) and (7). For example, if $f(z)$ specifies the gamma ray intensity of horizontal beds penetrated by a vertical bore hole, $z$ specifies the distance to the beds from some reference point and $r(x)$ specifies the measured gamma ray log, then to apply the theory it must be true that beds with $k$ times the gamma ray intensity will produce $k$ times the instrument response. This is condition (5) or a law of behavior that the measuring system must satisfy to be represented by the mathematical model herein defined. Furthermore, a system of beds that has a gamma ray intensity $f(z)$ which is the sum of the intensities of two separate systems $f_1(z)$ and $f_2(z)$ will produce an instrument response $r(k)$ which is the sum of the instrument responses of $f_1(z)$ and $f_2(z)$ or $$r_1(k)+r_2(k)$$

This means that the gamma ray intensity $f(z)$ is obtained by a simple addition of the source materials in the two beds, that is, there can be no interaction of source materials if condition (6) is to be satisfied. The third condition (7) is almost always satisfied in a physical system under measurement. This latter condition is to the effect that if the original or zero reference point is shifted then the zero reference of the response is shifted by the same amount. Whenever differential equations are considered and $z$ represents time, condition (6) means, among other things, that the differential equations have constant coefficients. In the above example wherein $z$ represents a space coordinate such as a well depth, the corresponding meaning is that the basic behavior of the logging instrument is a function only of the relative position of the instrument in the well.

As employed herein the symbol G before $f(z)$ indicates the operation of forming $u(x)$ such that $$Gf(z)=u(x)=\sum_k f(k)x^k=\sum_k a_k x^k \quad (8)$$

$G^{-1}$ is designated as the inverse operator so that $$G^{-1}Gf(z)=G^{-1}u(x)=f(z) \quad (9)$$

If $f(z)$ is defined for values other than $a_k$, then the other values must be selected by some rule.

The operator G is a linear operator for $$Gkf(z)=kGf(z)=ku(x) \quad (10)$$

and $$G[f_1(z)+f_2(z)]=Gf_1(z)+Gf_2(z)=u_1(x)+u_2(x) \quad (11)$$

as can be seen by carrying out the operations designated.

If $h$ in (7) is the tabular interval or an integral multiple thereof, then G is an operator of the closed cycle for $$Gf(z)=\sum_k f(k)x^k \quad (12)$$

and $$Gf(z+h)=\sum_k f(k+h)x^k \quad (13)$$

Incidentally, this shows that $$x^{-1}Gf(z)=Gf(z+1)=x^{-1}u(x) \quad (14)$$

From (14) the G transform of the first difference Δ is $$G[f(z+1)-f(z)]=G_h f(z)=(x^{-1}-1)u(x) \quad (15)$$

The G transform for the $n$th difference may be written as $$G\Delta^n f(z)=(x^{-1}-1)^n u(x) \quad (16)$$

Equation 14 is of considerable importance in that it interprets the meaning of the indeterminate $x$ in the polynomial of Equation 8. From the fact that the product of two polynomials Q($x$) and P($x$) can be written $$Q(x)a_0+Q(x)a_1x+Q(x)a_2x^2+ \ldots \quad (17)$$

the resultant polynomial can be thought of as composed of polynomials Q($x$) weighted according to the values of P($x$). This is generally referred to as a convolution operation.

The computing system of this invention is particularly adapted for use as a universal tuning system. By a universal tuning system is meant a system which can be tuned to respond to a wide class of signal spectra. Such a system is of importance in seismic prospecting, for example. Seismic prospecting, as is well known by those skilled in the art, is a system whereby information is obtained regarding subsurface earth strata by transmitting vibrations from a first preselected point at or near the surface of the earth downward to the formations and measuring the reflected or refracted vibrations at other pick-up locations positioned at or near the surface of the earth. To this end an explosive charge is detonated in a shot hole and a plurality of vibration pick-ups are disposed in a preselected path spaced from the shot hole. The vibrations incident upon these pick-ups are converted into corresponding electrical signals which normally are amplified and recorded in relation to one another. By timing the arrival of selected reflections valuable information can be obtained regarding the depth and slope of selected earth formations. Unfortunately, extraneous vibrations usually are present which tend to obscure the recognition of the desired signals. Thus, it is desired to be able to tune the vibration pickup mechanism so as to eliminate the high or low frequencies which are representative of undesired reflections or stray vibrations such as surface waves. This tuning is accomplished in accordance with the present invention by multiplying the vibration signal received at the individual pickups by an expression representative of the signal which is desired to be transmitted by the tuning system. Whenever there is a correspondence between the input signal and the desired signal the measured product becomes a maximum which is indicative of the correspondence.

One particular example of the use of the computing system of this invention to divide algebraic polynomials occurs in interpreting well logging data. In the case of well logging an instrument is lowered into the bore hole which is sensitive to some physical property (parameter) of the materials surrounding the instrument. At any position in the hole the instrument has an output which is a weighted average of the value of the parameter throughout a region surrounding the instrument. The weight factor is assumed to be a geometrical factor which assumes the same value for all points on a circle centered on the axis of the hole and lying in a plane normal to that axis. In general, the weight factor falls off to negligible values beyond a few feet from the instrument. As the instrument is lowered in the hole this zone of influence may be thought of as moving with the instrument and scanning the hole. The instrument output is, therefore, a running weighted average which prevents the log from having a point to point correspondence with a parameter characterizing the formations penetrated. The nature of this scanning or integrating process is an important property of the log and may be used to characterize the basic complexity of the method of measuring the parameter. If the instrument response to a certain individual bed is known, the true parameter of the bore hole can be obtained by dividing the measured response by the instrument response to a single bed.

Acccording, it it is an object of this invention to provide an improved method of and apparatus for multiplying and dividing algebraic polynomials.

Another object is to provide a universal tuning system which is adapted to detect wave forms of any predetermined configuration.

Another object is to provide a filter system for seismic surveying which can be tuned to transmit a predetermined wave form.

Still another object is to provide a system for obtaining true parameters from measured well logging data.

Various other objects, advantages and features of this invention should become apparent from the following detailed description taken in conjunction with the accompanying drawing in which:

Figure 1 is a schematic representation of seismic exploration apparatus;

Figures 2$a$ and 2$b$ are simplified representations of seismic signals recorded by the apparatus of Figure 1;

Figures 2$c$ and 2$d$ are representations of transformed signals obtained in accordance with this invention;

Figure 5:
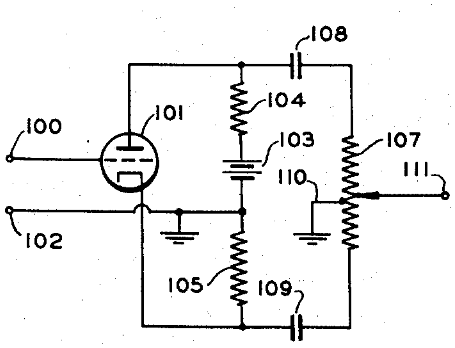
Figure 6:
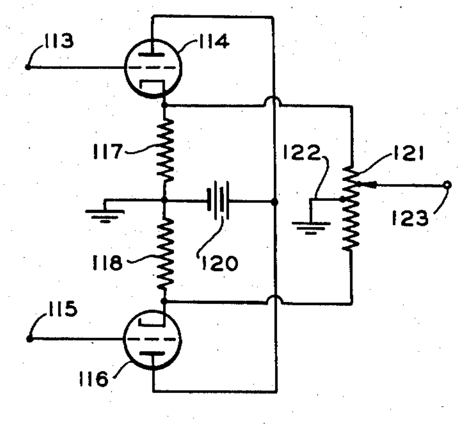
Figure 7:
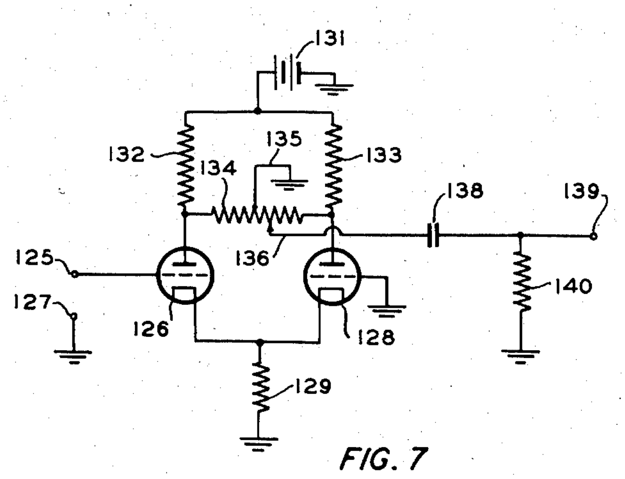
Figure 8:
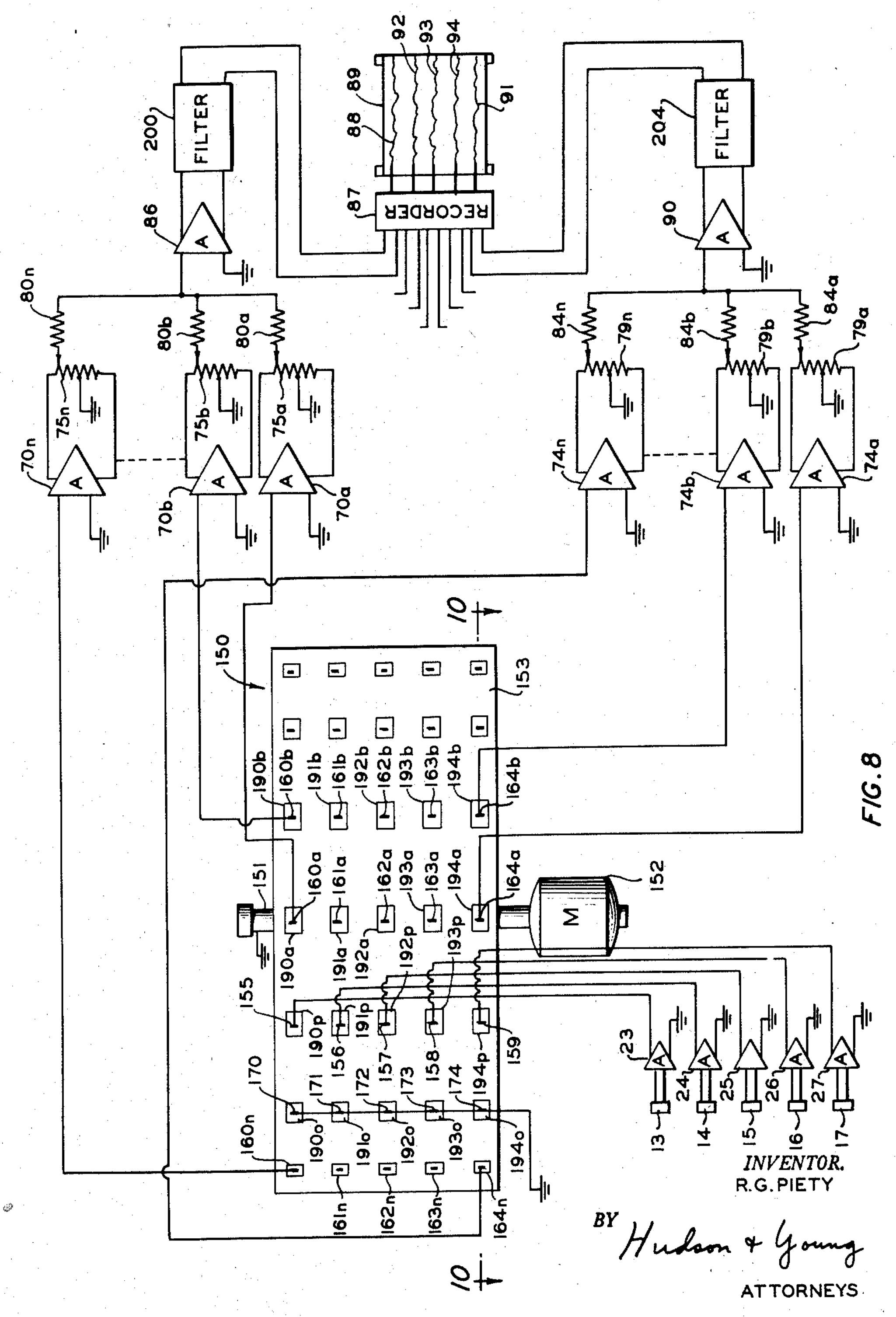
Figure 9:
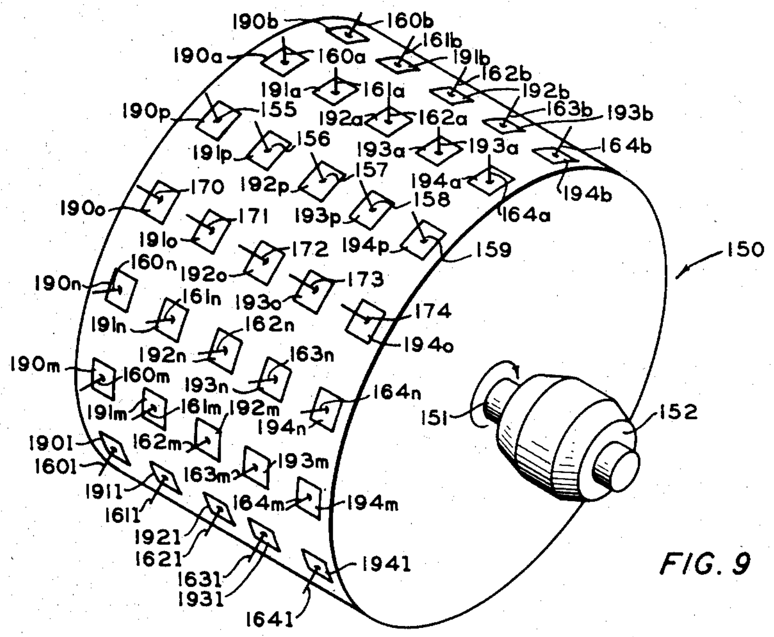
Figure 10:
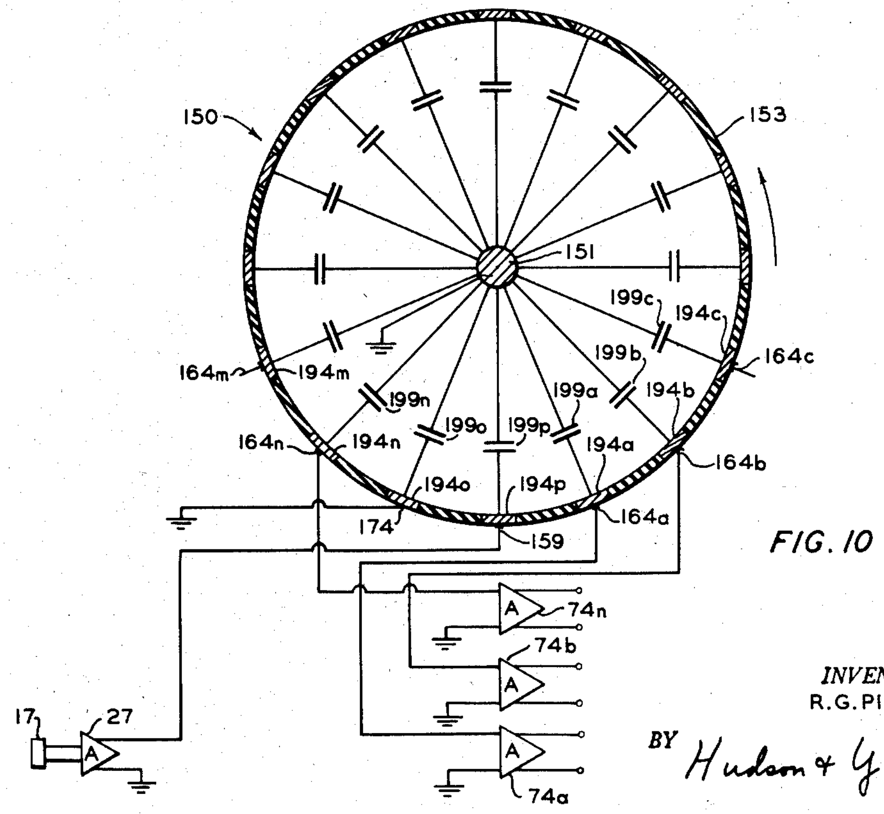
Figure 11:
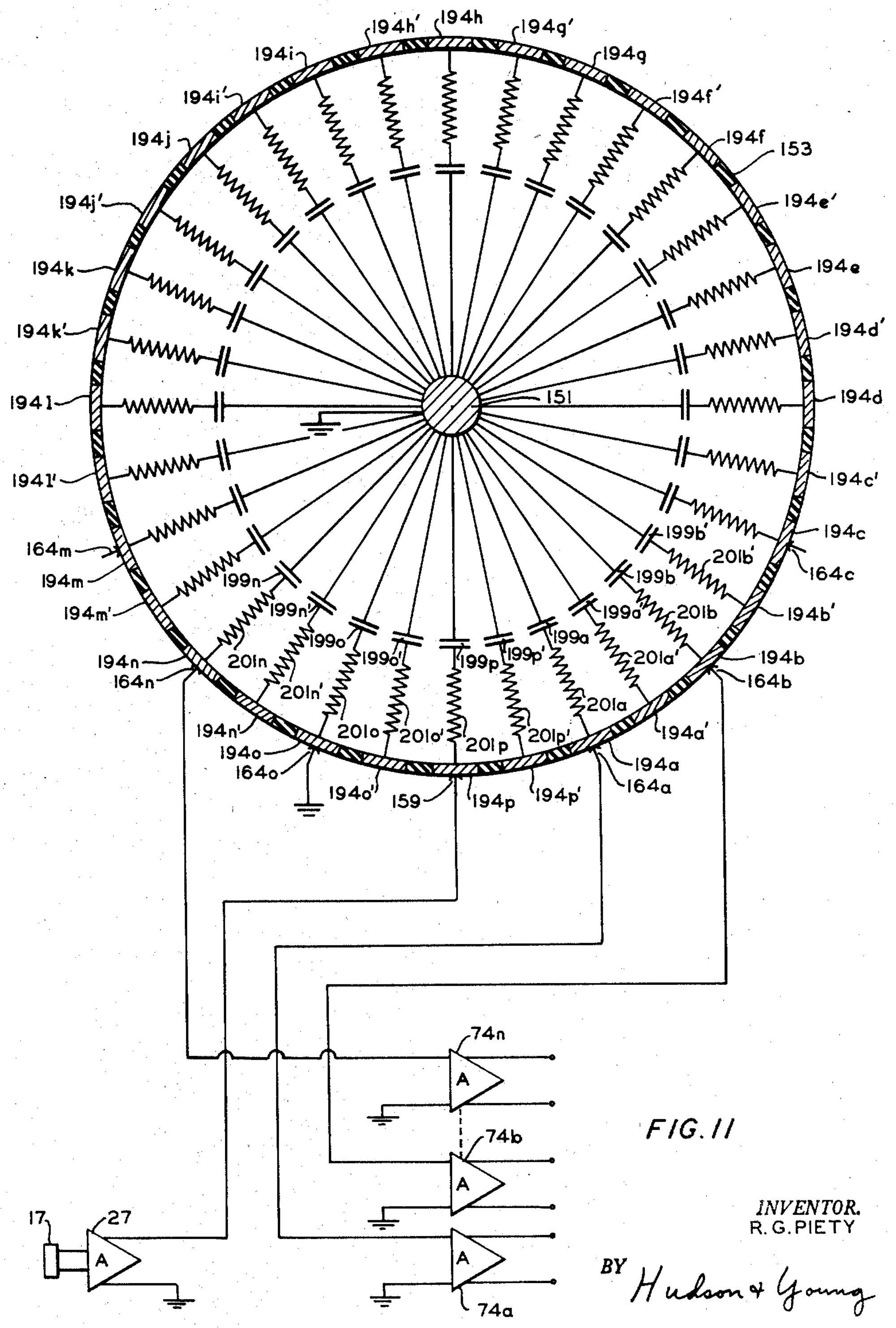
Figure 14:
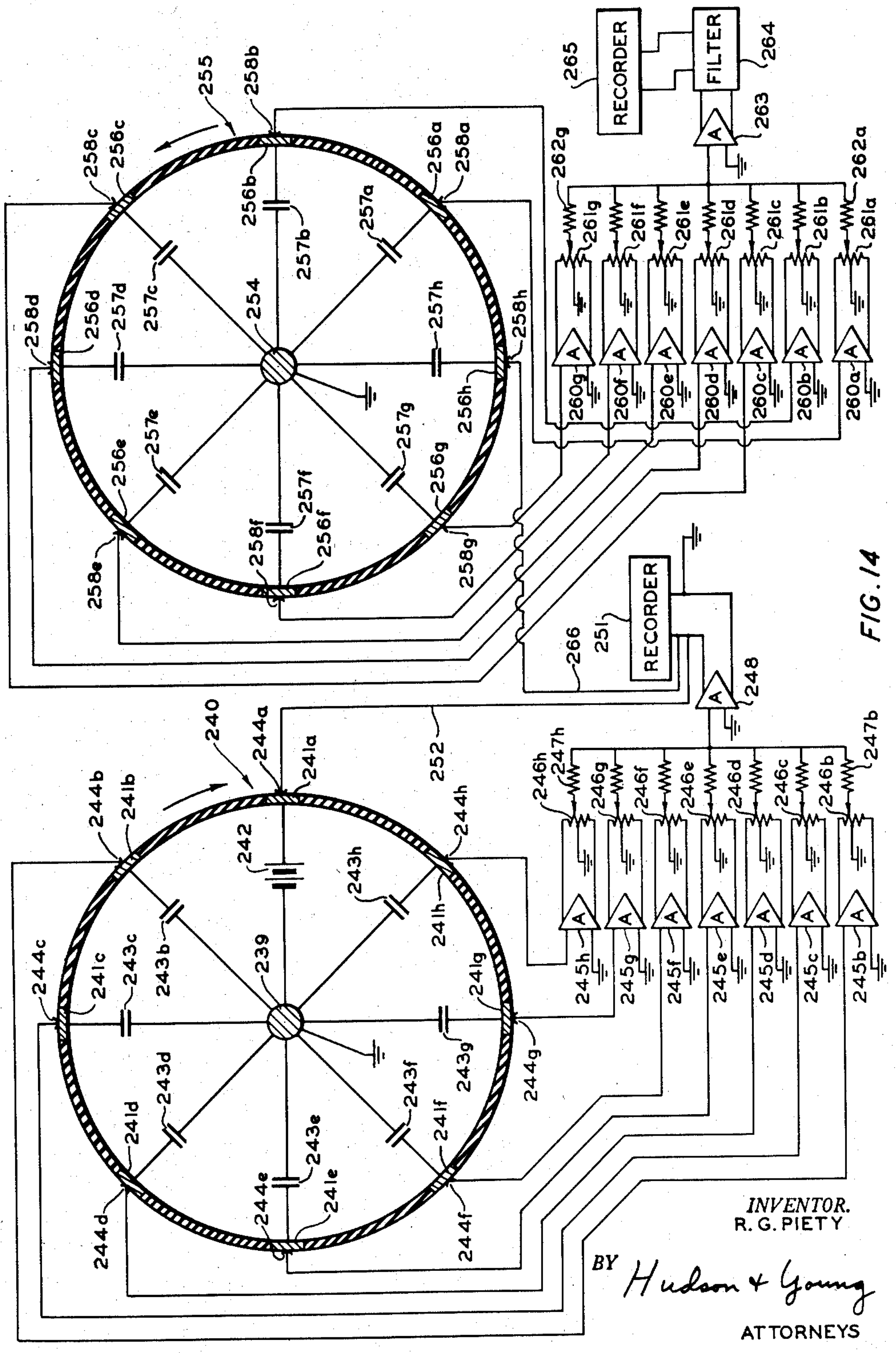
Figure 16:
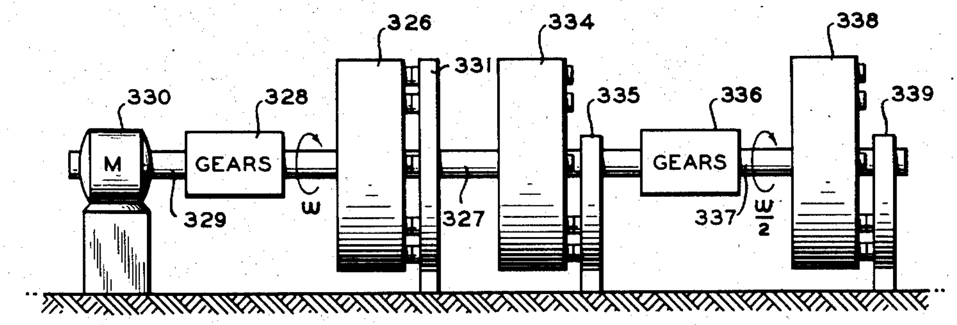
Figure 17:
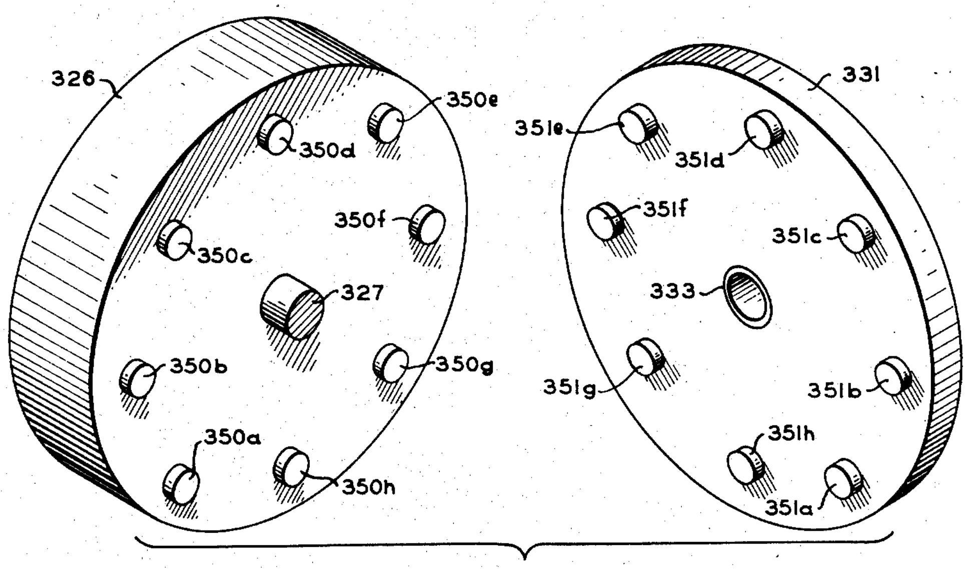
Figure 18:
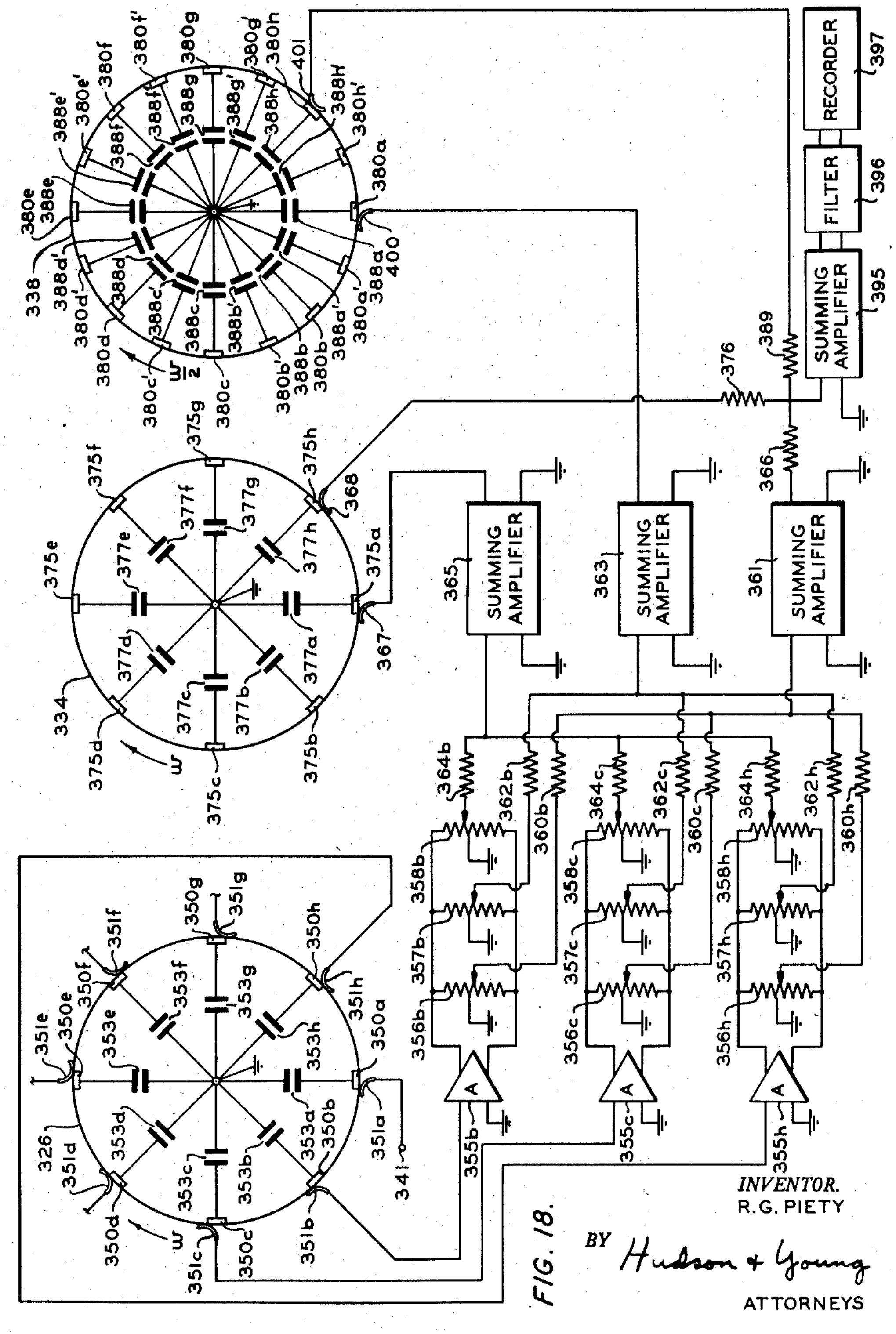
Figure 19:
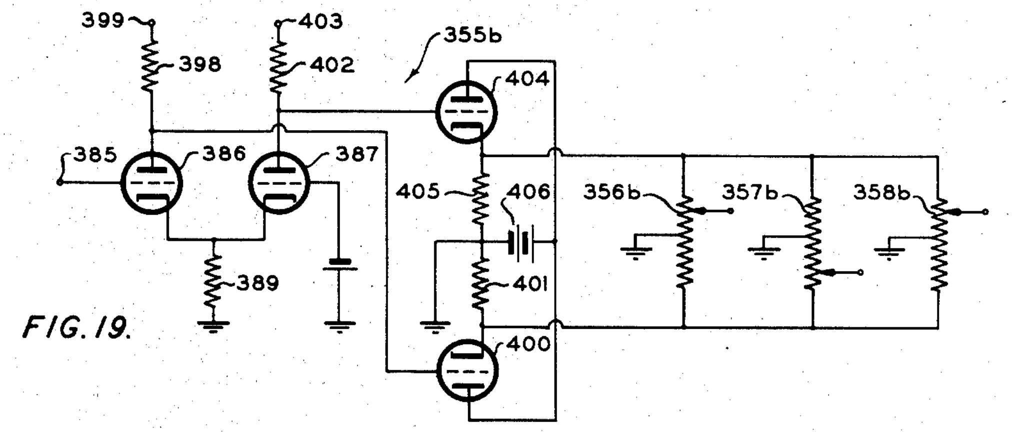
Figure 20:
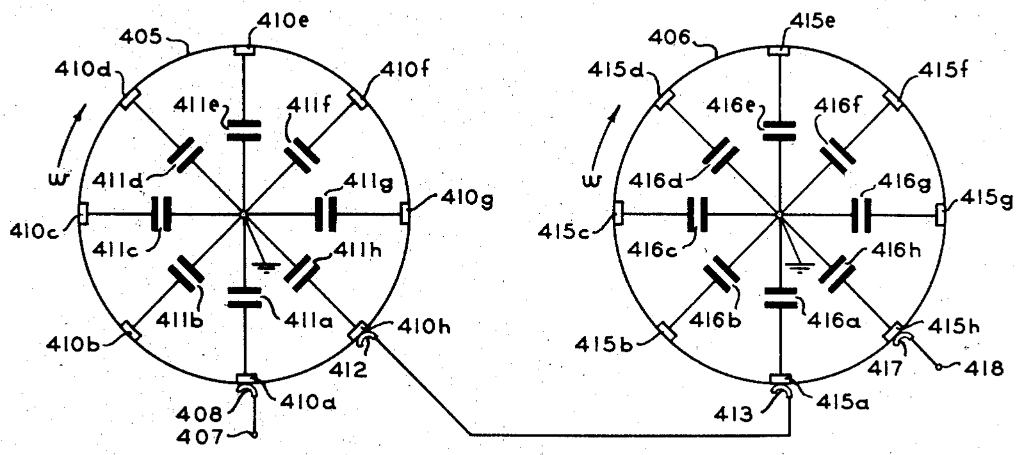
Figure 21:
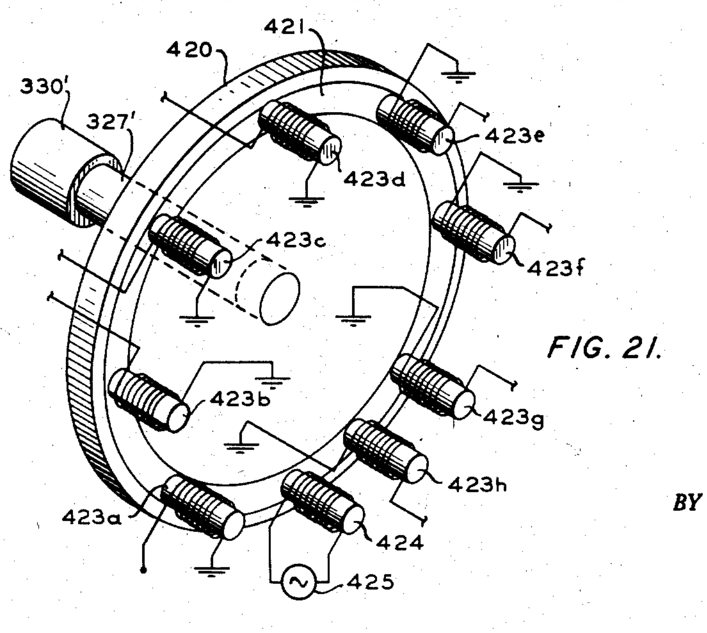

Figures 5, 6, and 7 are schematic circuit diagrams of weighted amplifiers utilized in the computing mechanism;

Figure 8 is a schematic view of a second embodiment of the polynomial multiplying apparatus employed to interpret seismic data;

Figure 9 is a second view of the apparatus of Figure 8;

Figure 10 is a schematic sectional view of the apparatus of Figures 8 and 9;

Figure 11 is a modified form of the apparatus of Figures 8, 9 and 10;

Figures 12$a$ and 12$b$ illustrate an embodiment of polynomial multiplying apparatus in disassembled position;

Figures 13$a$ and 13$b$ illustrate in a schematic manner electrical circuit details of the apparatus of Figures 12$a$ and 12$b$;

Figure 14 is a schematic view of one embodiment of the polynomial dividing apparatus;

Figure 15$a$ is a schematic representation of electrical well logging apparatus;

Figures 15$b$, 15$c$ and 15$d$ illustrate an application of the computing mechanism of this invention to the interpretation of well logging data;

Figure 16 is a schematic representation of the mechanical components of another embodiment of the signal transforming apparatus;

Figure 17 is a detailed view of a portion of the signal storage apparatus of Figure 16 in disassembled relation;

Figure 18 is a schematic circuit diagram of a first embodiment of the electrical components of the signal transforming apparatus of Figure 16;

Figure 19 is a schematic circuit diagram of an amplifier employed in Figure 18;

Figure 20 is a schematic circuit diagram of a modification of the apparatus of Figure 18;

Figure 21 is a schematic view of a magnetic signal storage unit; and

Figure 22:
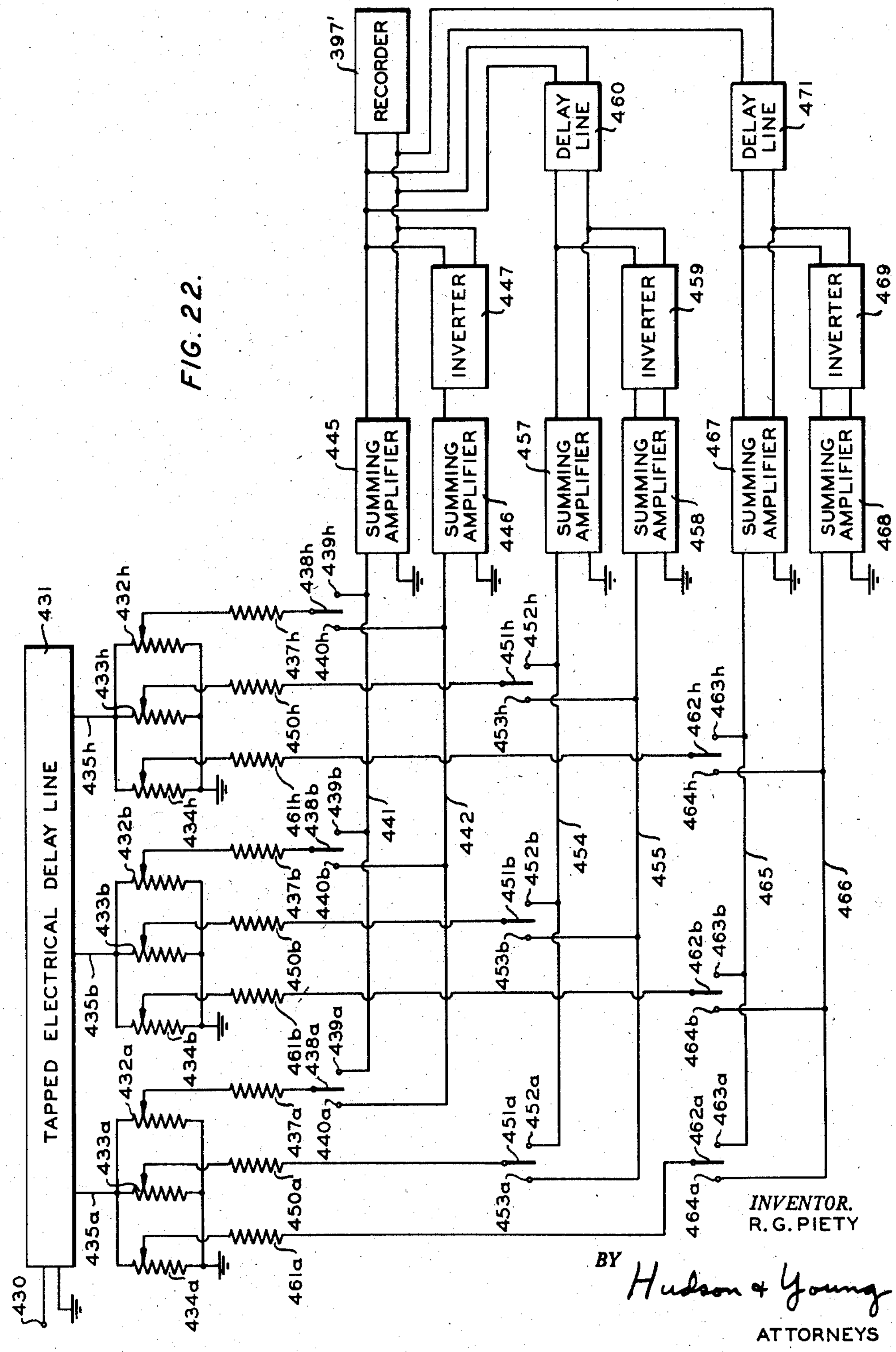

Figure 22 is a schematic diagram of an embodiment of this invention employing electrical delay lines.

Figure 1:
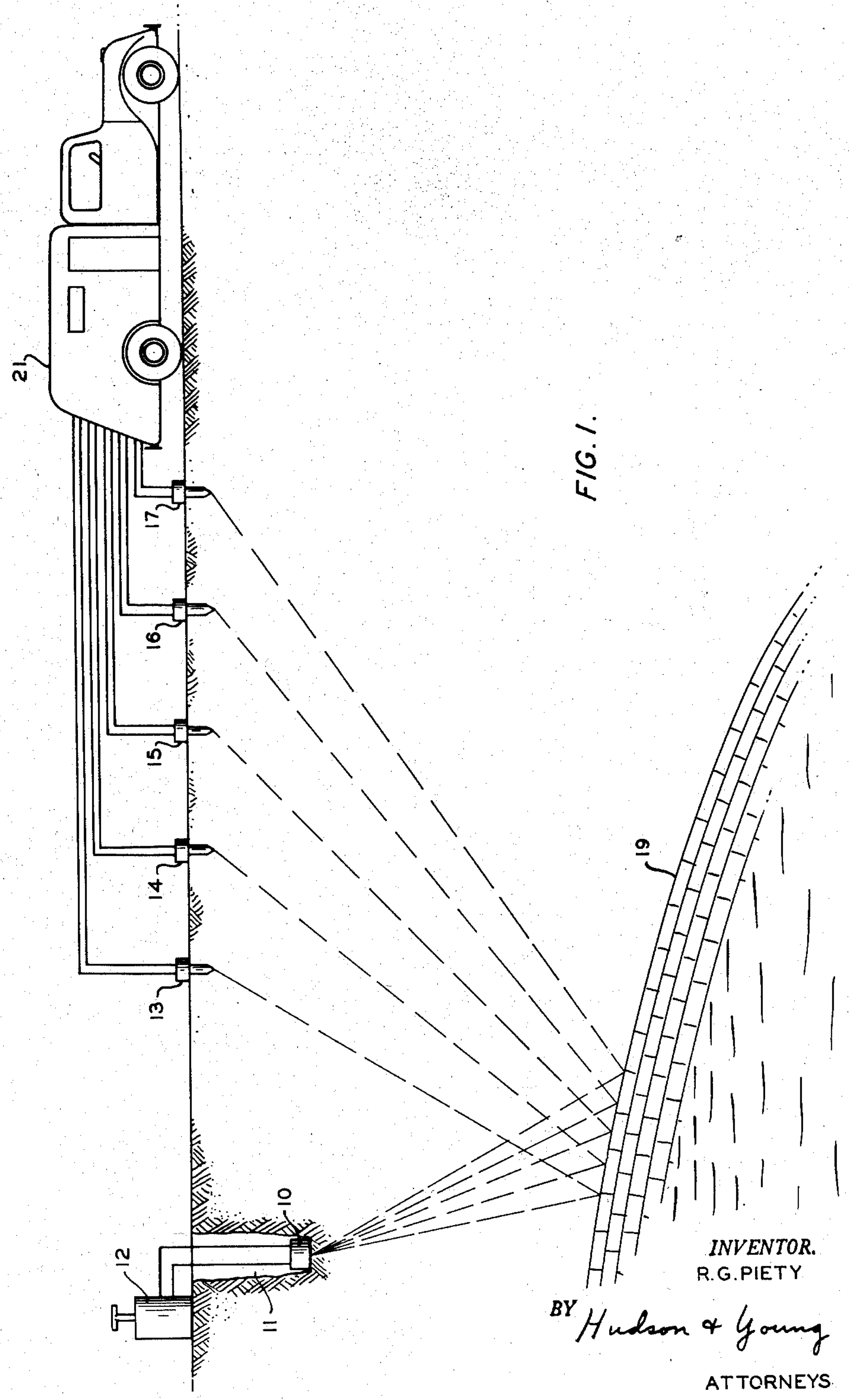

In order to describe the operation of this invention as an algebraic polynomial multiplier, reference is made herein to a specific application involving the recognition of selected reflections in seismic surveying. In Figure 1 there is illustrated a simplified conventional seismic surveying system. An explosive charge 10 is positioned within a shot hole 11 and electrically connected to a detonator 12 positioned at the surface. Detonation of explosive charge 10 results in vibrations being transmitted outward therefrom in all directions. A plurality of vibration pickup seismometers 13, 14, 15, 16 and 17 is positioned at or near the surface in a predetermined geometric array. In the illustrated example, vibrational waves travel downward from explosive charge 10 and are reflected upward from bed 19 to the several seismometers 13—17. It should be apparent from the figure that these reflected waves arrive at the five seismometers at slightly different times. Seismometer 13 is actuated first and there is a short time delay between arrivals of the reflected waves at seismometers 14, 15, 16 and 17. This difference in time between actuation of the several seismometers is due to the difference in the length of paths traveled by the several reflected waves downward from charge 10 to bed 19 and back upward to the surface. This time interval is, therefore, a definite function of the depth and dip of bed 19 and the geometric arrangement of the several seismometers at the surface. By measuring the time of arrival of the reflected signals at the different seismometers, the depth and dip of bed 19 can be determined if the velocities of the seismic waves in the various formations between the surface and bed 19 are known.

Figure 2A:
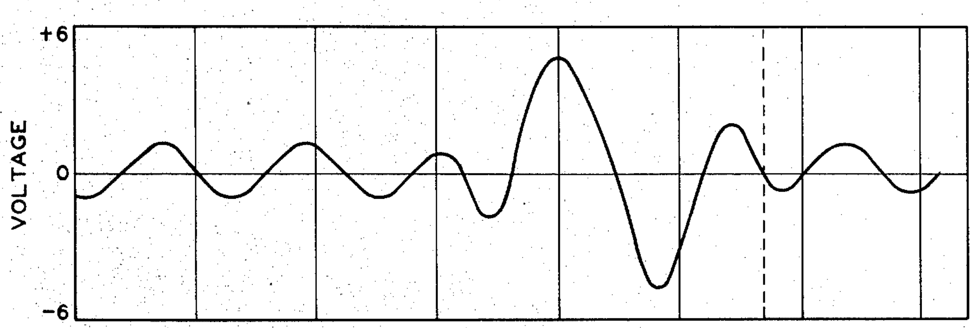

For purposes of determining the time of arrival of the reflected waves at the several seismometers it is conventional to record the vibrations picked up at these seismometers by suitable electrical equipment which conveniently is carried in a truck 21. By recording the vibrations from the several seismometers side by side on a common recording medium, it is sometimes possible to obtain the time of arrival of the reflected waves by direct observation of the recorded traces. In Figure 2*a* there is illustrated a somewhat ideal record of such recorded vibrations at a single seismometer, wherein the output voltage of the seismometer is plotted against time. The vibration pattern illustrated between the time intervals $t_{15}$ and $t_{28}$ represents the wave reflected from bed 19.

Figure 2B:
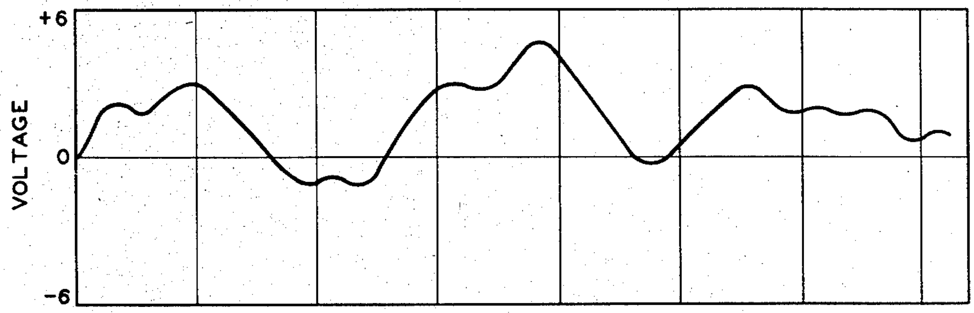

As is well known, surface waves, refracted waves and other more or less random waves are generated by the detonation of explosive 10. In actual practice the problem of identifying a reflected signal such as shown in Figure 2*a* is complicated by the fact that other vibrations of varying amplitude and frequency usually are received at the seismometers in addition to the desired reflected signal. These latter waves are of course received by the several seismometers 13—17 and are superimposed on the desired reflected wave. In Figure 2*b* there is illustrated a curve which approximates the vibration actually received by any one of the seismometers to a closer degree than does the curve illustrated in Figure 2*a*. However, even the curve of Figure 2*b* is idealized to a certain extent, and in actual practice even more stray vibrations generally are superimposed upon the desired reflected signal. The presence of these stray vibrations obviously tends to complicate the problem of distinguishing the reflected waves and particularly determining the exact time of arrival of the reflected waves.

Figure 3:
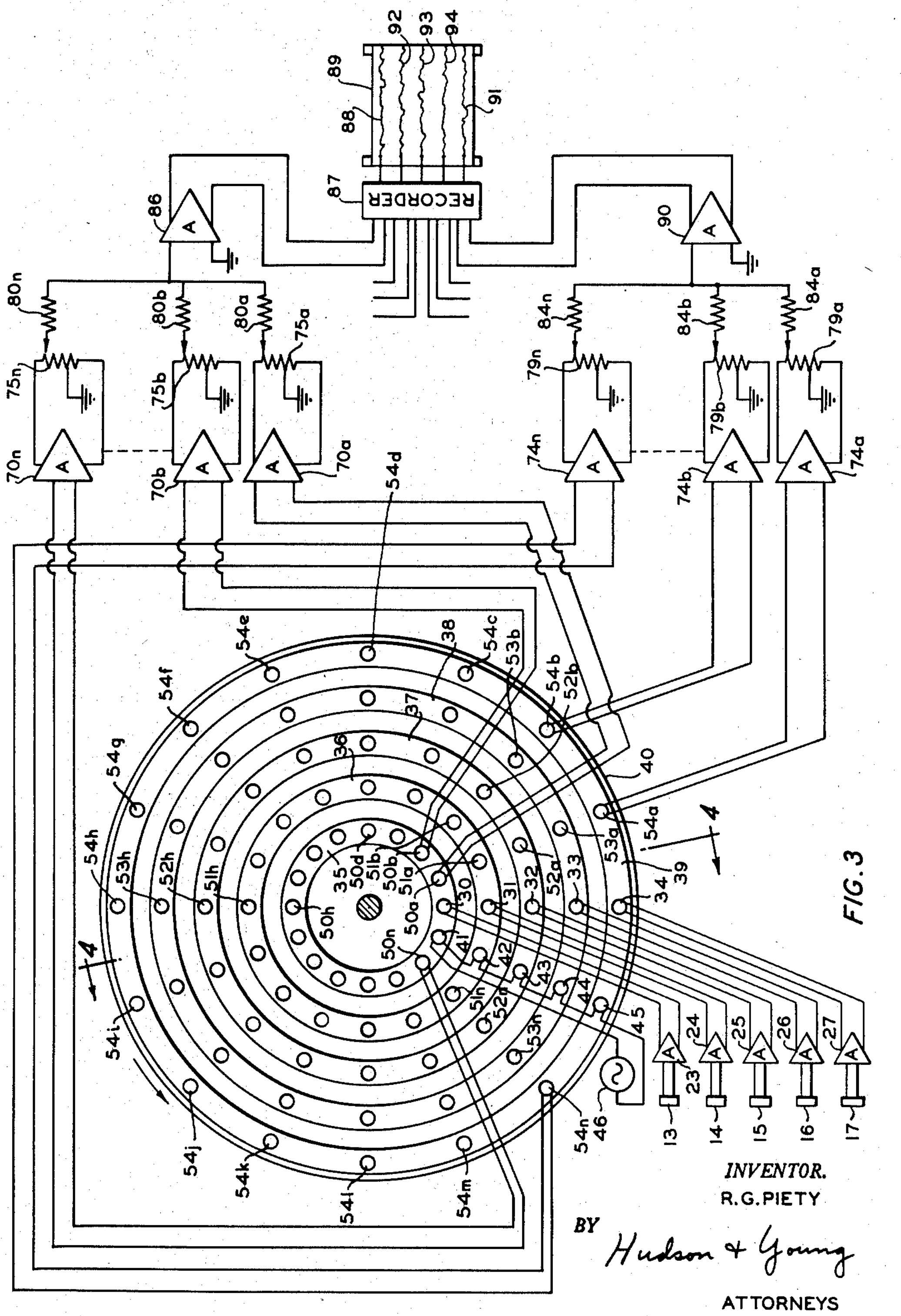
Figure 3 is a schematic view of a first embodiment of the polynomial multiplying apparatus employed to interpret seismic data.
Figure 4:
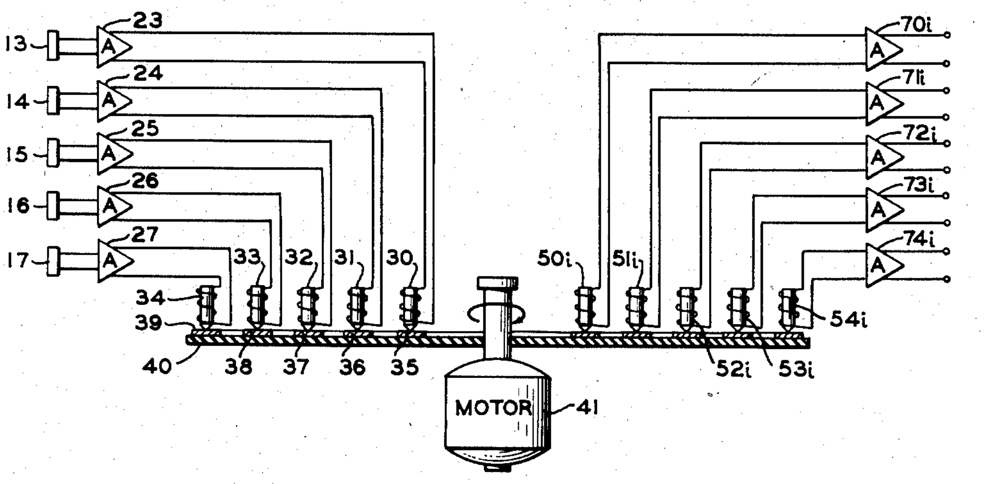
Figure 4 is a view taken along line 4—4 in Figure 3.

In order to provide a tuning system which recognizes the desired reflected wave form, the computing system of the present invention is employed. One particular embodiment of apparatus in accordance with this invention is illustrated in Figures 3 and 4. The output signals from seismometers 13, 14, 15, 16 and 17 are applied to the input terminals of respective amplifiers 23, 24, 25, 26 and 27. The output terminals of amplifiers 23, 24, 25, 26 and 27 are applied to respective magnetic recorders 30, 31, 32, 33 and 34 which are positioned above and in closely spaced relation with respective annular strips of magnetic material 35, 36, 37, 38 and 39, the latter being mounted on the upper surface of a disc 40 which is rotated at a predetermined speed by a motor 47. Magnetic recorders 30, 31, 32, 33 and 34 are positioned along a radial line of disc 40 and can be of any conventional structure known in the art which is adapted to magnetize the adjacent magnetic strips when an electric current is applied to the recorder. Thus, the output electrical signals from seismometers 13, 14, 15, 16 and 17, which are representative of the vibrations received by these seismometers, result in respective strips 35, 36, 37, 38 and 39 being magnetized in accordance with the vibrations received by the respective seismometers. Disc 40 is rotated in a counterclockwise direction as illustrated in Figure 3 such that continuous records of the seismometer outputs are applied to the respective magnetic strips. A series of five obliterating units 41, 42, 43, 44 and 45 is positioned above disc 40 adjacent respective recorders 30, 31, 32, 33 and 34 such that the individual units are located in closely spaced relation to respective strips 35, 36, 37, 38 and 39. A source of high frequency voltage 46 is connected in circuit with each of the obliterating units to demagnetize the individual strips continuously as disc 40 is rotated. Thus, any magnetism induced in the individual strips by the recorders is erased before the strips pass back under the respective recorders.

A plurality of pickup units, which can be of construction similar to the magnetic recorders, is disposed above and in closely spaced relation with each of the strips 35, 36, 37, 38 and 39. In the illustrated embodiment there are fourteen pickups associated with each magnetic strip. Pickups 50*a*, 50*b*, . . . 50*n* are positioned above strip 35 in equally spaced relationship; pickups 51*a*, 51*b*, . . . 51*n* are positioned above strip 36 in equally spaced relationship; pickups 52*a*, 52*b*, . . . 52*n* are positioned above strip 37 in equally spaced relationship; pickups 53*a*, 53*b*, . . . 53*n* are positioned above strip 38 in equally spaced relationship; and pickups 54*a*, 54*b*, . . . 54*n* are positioned above strip 39 in equally spaced relationship. As the individual magnetic strips pass under the respective pickups associated therewith, voltages are induced in the pickups which correspond to the voltages previously applied to the respective magnetic recorders from the seismometer amplifiers 23—27. The output terminals of pickups 50*a*, 50*b*, . . . 50*n* are applied to the input terminals of respective amplifiers 70*a*, 70*b*, . . . 70*n*; and the output terminals of pickups 54*a*, 54*b*, . . . 54*n* are applied to the input terminals of respective amplifiers 74*a*, 74*b*, . . . 74*n*. The amplifiers connected to pickups 50*c*, 50*d*, . . . 50*m* and to pickup coils 54*c*, 54*d*, . . . 54*m* are omitted from Figure 3 for purposes of simplicity. In like manner corresponding amplifiers are connected to the pickups 51*a*, 51*b*, . . . 51*n*; 52*a*, 52*b*, . . . 52*n*; and 53*a*, 53*b*, . . . 53*n*, but these latter amplifiers also are omitted from the drawing for purposes of simplicity. The output terminals of amplifiers 70*a*, 70*b*, . . . 70*n* are connected across the end terminals of respective potentiometers 75a, 75b, . . . 75n. Potentiometers 75a, 75b, . . . 75n are provided with respective grounded center taps. The output terminals of amplifiers 74a, 74b, . . . 74n are connected across the end terminals of respective potentiometers 79a, 79b, . . . 79n. Potentiometers 79a, 79b, . . . 79n are likewise provided with grounded center taps. The output contactors of potentiometers 75a, 75b, . . . 75n are connected through respective resistors 80a, 80b, . . . 80n to the first input terminal of a summing amplifier 86, the second input terminal of which is grounded. The output terminals of amplifier 86 are applied to the first set of input terminals of a multichannel recorder 87 which provides a trace 88 on a chart 89, the latter being moved past recorder 87 at a predetermined speed. Recorder 87 can be any type recorder desired. The output contactors of potentiometers 79a, 79b, . . . 79n are connected through respective resistors 84a, 84b, . . . 84n to the first input terminal of a summing amplifier 90, the second input terminal of which is grounded. The output terminals of amplifier 90 are applied to a second set of input terminals of recorder 87 which provides a second trace 91 on chart 89. Three other traces 92, 93, and 94 are provided on chart 89 by the summing amplifiers, not shown, which are employed to sum the outputs of the amplifiers connected to the respective pickups 51a, 51b, . . . 51n; 52a, 52b, . . . 52n; and 53a, 53b, . . . 53n. The amplifier and summing circuits associated with these latter groups of pickups are identical to the circuits illustrated, but are omitted from the drawing for the purpose of simplicity.

In Figures 5, 6, and 7 three amplifiers are shown which can be employed as amplifiers 70a, 70b, . . . 70n or 74a, 74b, . . . 74n in Figure 3. In the amplifier illustrated in Figure 5, a first input terminal 100 is connected to the control grid of a vacuum tube triode 101 and the second input terminal 102 is grounded. The anode of triode 101 is connected to the positive terminal of a voltage source 103 through an anode resistor 104 and the cathode of triode 101 is connected to the grounded negative terminal of voltage source 103 through a cathode resistor 105. The anode of triode 101 also is connected to the first end terminal of a potentiometer 107 through a capacitor 108 and the cathode of triode 101 is connected to the second end terminal of potentiometer 107 through a capacitor 109. Potentiometer 107 is provided with a first grounded center tap 110 and with an output contactor terminal 111. Potentiometer 107 corresponds to the potentiometer 75a associated with amplifier 70a, for example.

In the amplifier illustrated in Figure 6 a first input terminal 113 is connected to the control grid of a first vacuum tube triode 114, and a second input terminal 115 is connected to the control grid of a second vacuum tube triode 116. The cathode of triode 114 is connected to ground through a cathode resistor 117 and the cathode of triode 116 is connected to ground through a cathode resistor 118. The anodes of both triodes 114 and 116 are connected to the positive terminal of a voltage source 120, the negative terminal of which is grounded. The cathode of triode 114 is connected to the first end terminal of a potentiometer 121 and the cathode of triode 116 is connected to the second end terminal of potentiometer 121. Potentiometer 121 is provided with a first grounded center tap 122 and with an output contactor terminal 123. Potentiometer 121 also corresponds to the output potentiometer 75a associated with amplifier 70a, for example.

The amplifier illustrated in Figure 7 is provided with a first input terminal 125 which is connected to the control grid of a first vacuum tube triode 126, the second input terminal 127 being grounded. The cathode of triode 126 is connected to the cathode of a second vacuum tube triode 128, and the two cathodes are connected to ground through a common cathode resistor 129. The anode of triode 126 is connected to the positive terminal of a voltage source 131 through an anode resistor 132 and the anode of triode 128 is connected to the positive terminal of voltage source 131 through an anode resistor 133. The negative terminal of voltage source 131 is grounded. The anode of triode 126 also is connected to the first end terminal of a potentiometer 134 and the anode of triode 128 is connected to the second end terminal of potentiometer 134. Potentiometer 134 is provided with a grounded center tap 135. The output contactor 136 of potentiometer 134 is connected through a capacitor 138 to an output terminal 139. The junction between capacitor 138 and output terminal 139 is connected to ground through a resistor 140. Potentiometer 134 also corresponds to the potentiometer 75a associated with amplifier 70a, for example.

The operation of the mechanism thus far described to detect the time of arrival of the desired vibration reflections from bed 19 at seismometers 13, 14, 15, 16 and 17 is as follows: One or more preliminary shots are first fired in order to establish the basic form of the reflected wave to be recognized. Normally a location can readily be found wherein the recorded traces from the seismometers are sufficiently free from external vibrations that the reflected wave pattern can be obtained fairly accurately, at least from a plurality of trial shots. In making these trial shots conventional recording mechanism is employed, that is, the outputs of seismometers 13, 14, 15, 16 and 17 are amplified and recorded directly. For purposes of discussion it will be assumed that the desired reflected wave form is as illustrated in Figure 2a between time intervals $t_{15}$ and $t_{28}$. This desired wave form is divided, along the abscissa into as many equally spaced points (fourteen, for example) as pickup coils are provided above each of the strips on disc 40. In order to simplify the discussion, only seismometer 17 will be considered. The values of the ordinates of the curve of Figure 2a at each selected time interval are set on the respective potentiometers 79n, 79m, . . . 79a. Thus at time $t_{15}$ the ordinate of the curve has a value of $+1$, at time $t_{16}$ the ordinate has a value of zero, and at time $t_{28}$ the ordinate has a value of zero. These ordinate values are established on the corresponding potentiometers in the conventional manner for multiplication. For example, let it arbitrarily be assumed that the positive end terminal of potentiometer 79n is maintained at $+5$ volts and the negative terminal of potentiometer 79n is maintained at $-5$ volts. In order to establish a value of $+1$ on potentiometer 79a, the contactor thereof is positioned at one-fifth the distance between the grounded center tap and the positive end terminal, whereby the voltage at the contactor, taken with respect to ground, is $+1$ volt. If the voltage at the positive terminal of potentiometer 79n should increase to $+25$ volts, then the voltage at the contactor also is increased by a factor of five to $+5$ volts.

Once the ordinate values of the curve illustrated in Figure 2a are set on potentiometers 79n, 79m, . . . 79a, the mechanism is ready for operation. Seismometer 17 is positioned at the desired location, explosive charge 10 is detonated, and disk 40 is rotated at a speed such that one complete revolution is made during the interval represented between times $t_{15}$ and $t_{28}$ in Figure 2a. It should be apparent that the vibrations received at seismometer 17 are recorded continuously on strip 39 as disc 40 rotates past magnetic recorder 34. For purposes of discussion it will be assumed that a vibration pattern exactly as illustrated by the curve of Figure 2b is received by seismometer 17. Initially at zero time a zero voltage corresponding to the zero ordinate of the curve of Figure 2b is applied to magnetic recorder 34 which magnetizes the portion of strip 39 then under recorder 34 to a value corresponding to zero magnitude. It is assumed that magnetic strip 39 is initially de-magnetized such that zero outputs are received at the various pickup coils 54a, 54b, . . . 54n. At time $t_1$ the portion of strip 39 which initially was under recorder 34 is rotated so as to be under pickup 54*a*. This results in an output signal from pickup 54*a* which is representative of zero. This zero signal is applied through amplifier 74*a* across the output terminals of potentiometer 79*a*. It should be noted that the output contactor potentiometer 79*a* initially is positioned at a value corresponding to zero. This has the effect of multiplying the zero signal applied across the end terminals of potentiometer 79*a* by zero which results in an output voltage being applied to the input terminals of summing amplifier 90 which is representative of zero times zero or zero. An amplified voltage representative of this quantity is applied to recorder 87 with the result that a first point of curve 91 is traced on chart 89. At time $t_2$ disc 40 is rotated such that the portion of strip 39 which initially was under recorder 34 is moved to be under pickup 54*b*. This zero signal is multiplied by the +2 contactor setting on potentiometer 79*b* which results in a zero output voltage being applied through resistor 84*b*. Also, at the same time the second ordinate of the curve of Figure 2*a*, which has a value of +2, is rotated so as to be under pickup coil 54*a*. This voltage signal of +2 is in like manner multiplied by zero through potentiometer 79*a* which results in an output voltage from summing amplifier 90 which is representative of zero. This zero value forms the second point of curve 91. It should thus be apparent that as disc 40 rotates, a signal is applied to the input terminals of summing amplifier 90 which represents the sum of the product of the quantities passed through the several potentiometers 79*a*, 79*b*, etc. At each increasing time interval up to $t_{14}$, one additional quantity is summed by amplifier 90. At time $t_{15}$ the value initially applied to strip 39 at time zero is erased by obliterator unit 45 and a new value substituted therefor by recorder 34. This multiplication and summation process is illustrated mathematically in the following table:

TABLE I

*Potentiometer settings*

| 0 | 2 | 0 | −3 | −5 | −3 | 0 | 3 | 5 | 3 | 0 | −2 | 0 | 1 | |
|---|---|---|---|---|---|---|---|---|---|---|---|---|---|---|
| 0 | | | | | | | | | | | | | | 0 |
| 2 | 0 | | | | | | | | | | | | | 0 |
| 2 | 2 | 0 | | | | | | | | | | | | 4 |
| 2 | 2 | 2 | 0 | | | | | | | | | | | 4 |
| 3 | 2 | 2 | 2 | 0 | | | | | | | | | | −2 |
| 3 | 3 | 2 | 2 | 2 | 0 | | | | | | | | | −10 |
| 2 | 3 | 3 | 2 | 2 | 2 | 0 | | | | | | | | −16 |
| 1 | 2 | 3 | 3 | 2 | 2 | 2 | 0 | | | | | | | −21 |
| 0 | 1 | 2 | 3 | 3 | 2 | 2 | 2 | 0 | | | | | | −22 |
| −1 | 0 | 1 | 2 | 3 | 3 | 2 | 2 | 2 | 0 | | | | | −14 |
| −1 | −1 | 0 | 1 | 2 | 3 | 3 | 2 | 2 | 2 | 0 | | | | −2 |
| −1 | −1 | −1 | 0 | 1 | 2 | 3 | 3 | 2 | 2 | 2 | 0 | | | 12 |
| −1 | −1 | −1 | −1 | 0 | 1 | 2 | 3 | 3 | 2 | 2 | 2 | 0 | | 25 |
| 1 | −1 | −1 | −1 | −1 | 0 | 1 | 2 | 3 | 3 | 2 | 2 | 2 | 0 | 33 |
| 2 | 1 | −1 | −1 | −1 | −1 | 0 | 1 | 2 | 3 | 3 | 2 | 2 | 2 | 32 |
| 3 | 2 | 1 | −1 | −1 | −1 | −1 | 0 | 1 | 2 | 3 | 3 | 2 | 2 | 22 |
| 3 | 3 | 2 | 1 | −1 | −1 | −1 | −1 | 0 | 1 | 2 | 3 | 3 | 2 | 7 |
| 3 | 3 | 3 | 2 | 1 | −1 | −1 | −1 | −1 | 0 | 1 | 2 | 3 | 3 | −11 |
| 4 | 3 | 3 | 3 | 2 | 1 | −1 | −1 | −1 | −1 | 0 | 1 | 2 | 3 | −26 |
| 5 | 4 | 3 | 3 | 3 | 2 | 1 | −1 | −1 | −1 | −1 | 0 | 1 | 2 | −31 |
| 4 | 5 | 4 | 3 | 3 | 3 | 2 | 1 | −1 | −1 | −1 | −1 | 0 | 1 | −25 |
| 3 | 4 | 5 | 4 | 3 | 3 | 3 | 2 | 1 | −1 | −1 | −1 | −1 | 0 | −18 |
| 1 | 3 | 4 | 5 | 4 | 3 | 3 | 3 | 2 | 1 | −1 | −1 | −1 | −1 | −15 |
| 0 | 1 | 3 | 4 | 5 | 4 | 3 | 3 | 3 | 2 | 1 | −1 | −1 | −1 | −16 |
| 0 | 0 | 1 | 3 | 4 | 5 | 4 | 3 | 3 | 3 | 2 | 1 | −1 | −1 | −14 |
| 1 | 0 | 0 | 1 | 3 | 4 | 5 | 4 | 3 | 3 | 3 | 2 | 1 | −1 | 1 |
| 2 | 1 | 0 | 0 | 1 | 3 | 4 | 5 | 4 | 3 | 3 | 3 | 2 | 1 | 27 |
| 3 | 2 | 1 | 0 | 0 | 1 | 3 | 4 | 5 | 4 | 3 | 3 | 3 | 2 | 46 |
| 3 | 3 | 2 | 1 | 0 | 0 | 1 | 3 | 4 | 5 | 4 | 3 | 3 | 3 | 44 |
| 2 | 3 | 3 | 2 | 1 | 0 | 0 | 1 | 3 | 4 | 5 | 4 | 3 | 3 | 20 |
| 2 | 2 | 3 | 3 | 2 | 1 | 0 | 0 | 1 | 3 | 4 | 5 | 4 | 3 | −11 |
| 2 | 2 | 2 | 3 | 3 | 2 | 1 | 0 | 0 | 1 | 3 | 4 | 5 | 4 | −27 |
| 2 | 2 | 2 | 2 | 3 | 3 | 2 | 1 | 0 | 0 | 1 | 3 | 4 | 5 | −24 |
| 2 | 2 | 2 | 2 | 2 | 3 | 3 | 2 | 1 | 0 | 0 | 1 | 3 | 4 | −8 |
| 1 | 2 | 2 | 2 | 2 | 2 | 3 | 3 | 2 | 1 | 0 | 0 | 1 | 3 | 7 |
| 1 | 1 | 2 | 2 | 2 | 2 | 2 | 3 | 3 | 2 | 1 | 0 | 0 | 1 | 11 |
| 1 | 1 | 1 | 2 | 2 | 2 | 2 | 2 | 3 | 3 | 2 | 1 | 0 | 0 | 8 |

Input Signal — Output Signal

Figure 2C:
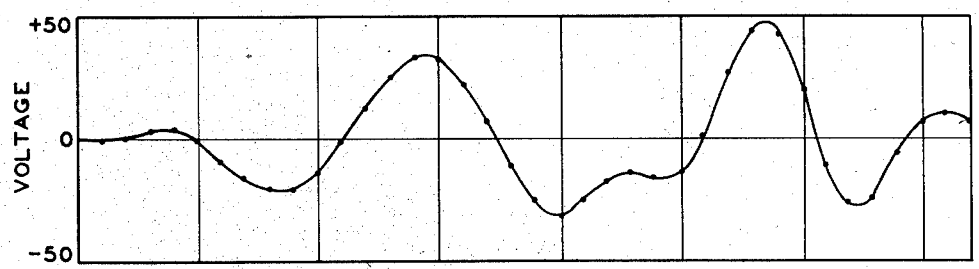

The values in the top row of Table I represent the ordinates of the curve of Figure 2*a* between times $t_{15}$ and $t_{28}$ arranged in reverse order. The values in the left-hand vertical column represent the ordinates of the curve of Figure 2*b* between the times zero and $t_{36}$. The values in the right-hand vertical column represent the summation of the products applied to recorder 87 from amplifier 90. For any given horizontal row the value in this summation column is obtained by multiplying each value in the horizontal row by the value appearing above that same row in the first horizontal column and summing same the individual products. The values in the right-hand vertical column represent the values applied to recorder 87 which define curve 91. This curve is illustrated in Figure 2*c*.

In order to explain the method by which the times of arrival of the reflected signals at the various seismometers are computed, it will be assumed that the curve illustrated in Figure 2*b* arrives at seismometer 13 at two time intervals prior to the arrival of the same curve at seismometer 17. Thus, the first value applied to recorder head 30 is +2 as represented by time $t_2$ in Figure 2*b*. In like manner the second value applied to recorder head 30 also is +2 as represented by time $t_3$ in Figure 2*b*. It should be noted that these two values are applied to recorder head 30 at same time as the zero and +2 values corresponding to the respective times zero and $t_1$ are applied to recorder 34. In Table II which follows, the corresponding multiplication and summation process for the circuit associated with recorder 30 is presented in detail.

TABLE II

*Potentiometer settings*

| 0 | 2 | 0 | −3 | −5 | −3 | 0 | 3 | 5 | 3 | 0 | −2 | 0 | 1 | |
|---|---|---|---|---|---|---|---|---|---|---|---|---|---|---|
| 2 | | | | | | | | | | | | | | 0 |
| 2 | 2 | | | | | | | | | | | | | 4 |
| 3 | 2 | 2 | | | | | | | | | | | | 4 |
| 3 | 3 | 2 | 2 | | | | | | | | | | | 0 |
| 2 | 3 | 3 | 2 | 2 | | | | | | | | | | −10 |
| 1 | 2 | 3 | 3 | 2 | 2 | | | | | | | | | −21 |
| 0 | 1 | 2 | 3 | 3 | 2 | 2 | | | | | | | | −28 |
| −1 | 0 | 1 | 2 | 3 | 3 | 2 | 2 | | | | | | | −24 |
| −1 | −1 | 0 | 1 | 2 | 3 | 3 | 2 | 2 | | | | | | −8 |
| −1 | −1 | −1 | 0 | 1 | 2 | 3 | 3 | 2 | 2 | | | | | 22 |
| −1 | −1 | −1 | −1 | 0 | 1 | 2 | 3 | 3 | 2 | 2 | | | | 28 |
| 1 | −1 | −1 | −1 | −1 | 0 | 1 | 2 | 3 | 3 | 2 | 2 | | | 32 |
| 2 | 1 | −1 | −1 | −1 | −1 | 0 | 1 | 2 | 3 | 3 | 2 | 2 | | 31 |
| 3 | 2 | 1 | −1 | −1 | −1 | −1 | 0 | 1 | 2 | 3 | 3 | 2 | 2 | 22 |
| 3 | 3 | 2 | 1 | −1 | −1 | −1 | −1 | 0 | 1 | 2 | 3 | 3 | 2 | 7 |
| 3 | 3 | 3 | 2 | 1 | −1 | −1 | −1 | −1 | 0 | 1 | 2 | 3 | 3 | −11 |
| 4 | 3 | 3 | 3 | 2 | 1 | −1 | −1 | −1 | −1 | 0 | 1 | 2 | 3 | −26 |
| | 4 | 3 | 3 | 3 | 2 | 1 | −1 | −1 | −1 | −1 | 0 | 1 | 2 | −31 |
| 4 | 5 | 4 | 3 | 3 | 3 | 2 | 1 | −1 | −1 | −1 | −1 | 0 | 1 | −25 |
| 3 | 4 | 5 | 4 | 3 | 3 | 3 | 2 | 1 | −1 | −1 | −1 | −1 | 0 | −18 |
| 1 | 3 | 4 | 5 | 4 | 3 | 3 | 3 | 2 | 1 | −1 | −1 | −1 | −1 | −15 |
| 0 | 1 | 3 | 4 | 5 | 4 | 3 | 3 | 3 | 2 | 1 | −1 | −1 | −1 | −16 |
| 0 | 0 | 1 | 3 | 4 | 5 | 4 | 3 | 3 | 3 | 2 | 1 | −1 | −1 | −14 |
| 1 | 0 | 0 | 1 | 3 | 4 | 5 | 4 | 3 | 3 | 3 | 2 | 1 | −1 | 1 |
| 2 | 1 | 0 | 0 | 1 | 3 | 4 | 5 | 4 | 3 | 3 | 3 | 2 | 1 | 27 |
| 3 | 2 | 1 | 0 | 0 | 1 | 3 | 4 | 5 | 4 | 3 | 3 | 3 | 2 | 46 |
| 3 | 3 | 2 | 1 | 0 | 0 | 1 | 3 | 4 | 5 | 4 | 3 | 3 | 3 | 44 |
| 2 | 3 | 3 | 2 | 1 | 0 | 0 | 1 | 3 | 4 | 5 | 4 | 3 | 3 | 20 |
| 2 | 2 | 3 | 3 | 2 | 1 | 0 | 0 | 1 | 3 | 4 | 5 | 4 | 3 | −11 |
| 2 | 2 | 2 | 3 | 3 | 2 | 1 | 0 | 0 | 1 | 3 | 4 | 5 | 4 | −27 |
| 2 | 2 | 2 | 2 | 3 | 3 | 2 | 1 | 0 | 0 | 1 | 3 | 4 | 5 | −24 |
| 2 | 2 | 2 | 2 | 2 | 3 | 3 | 2 | 1 | 0 | 0 | 1 | 3 | 4 | −8 |
| 1 | 2 | 2 | 2 | 2 | 2 | 3 | 3 | 2 | 1 | 0 | 0 | 1 | 3 | 7 |
| 1 | 1 | 2 | 2 | 2 | 2 | 2 | 3 | 3 | 2 | 1 | 0 | 0 | 1 | 11 |
| 1 | 1 | 1 | 2 | 2 | 2 | 2 | 2 | 3 | 3 | 2 | 1 | 0 | 0 | 8 |

Input Signal — Output Signal

Figure 2D:
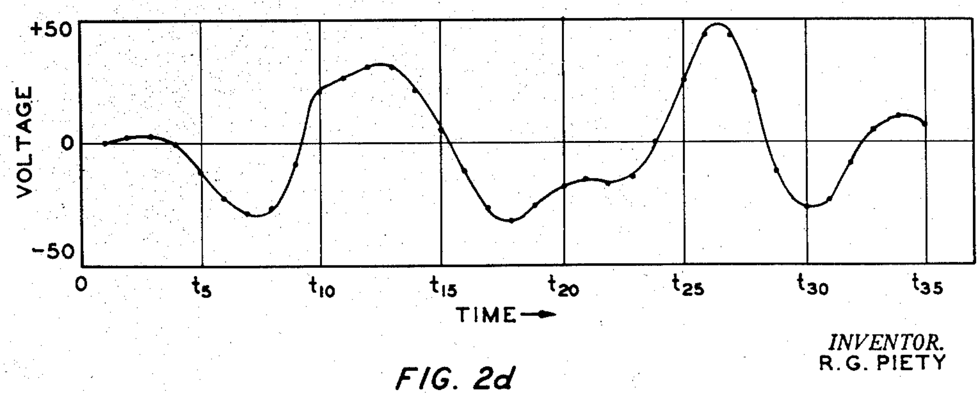

The values in the right-hand vertical column of Table II represent curve 88 on chart 89. This curve is illustrated in Figure 2*d*. From a comparison of the curves of Figures 2*c* and 2*d* it can be seen that a maximum peak occurs in Figure 2*c* between time $t_{28}$ and $t_{29}$, and that a corresponding maximum peak occurs in Figure 2*d* between times $t_{26}$ and $t_{27}$. The difference in time between these two maximum peaks represents the difference in time of arrival of the desired reflected wave pattern at seismometers 13 and 17. This operation is one of cross correlation wherein the function set on the potentiometers is correlated with the corresponding function which appears in the input signal. While the illustrated example has assumed a somewhat ideal wave form it should be apparent that by selecting a large number of time intervals any desired degree of accuracy can be obtained. It should be noted that the stray vibrations normally are completely at random and as such tend to cancel one another. While individual points have been selected to facilitate explanation, it should be apparent that continuous signals are recorded on the several magnetic strips such that a smooth output curve is realized. For most seismic work the highest frequency of interest is of the order of 100 cycles per second. Therefore, approximately fifty pickups associated with each magnetic strip will give adequate tuning with a tuning interval of one-fourth second. For simplicity of explanation, fourteen pickups associated with each magnetic strip have been described although it is to be understood that any number of such pickups desired can be employed. The particular group of seismometers illustrated has included five vibration pickups, although it is well known that a larger number normally are utilized. If a larger number of pickups is provided, a corresponding increase in the number of magnetic strips on disc 40 is needed. However, a plurality of discs rotating simultaneously can be provided if the number of seismometers is too large to be represented conveniently on a single rotating disc.

In Figures 8, 9 and 10 there is illustrated a second embodiment of apparatus constructed in accordance with this invention for use in seismic tuning. In this particular embodiment the vibrations recorded at the several seismometers 13—17 are amplified and applied as electric voltages to a plurality of rotating condensers. The voltages applied to these condensers subsequently are applied through a plurality of pickup brushes to output multiplying and summing circuits corresponding to those previously described. To this end there is provided a hollow drum 150 mounted on a shaft 151 which is rotated by a motor 152. The outer shell 153 of drum 150 is constructed of an electrically insulating material. Corresponding first output terminals of seismic amplifiers 23, 24, 25, 26 and 27 are connected to respective brushes 155, 156, 157, 158 and 159 which are disposed in spaced relationship adjacent the periphery of drum 150 so as to make contact the outer surface thereof as the drum rotates past these brushes. Brushes 155, 156, 157, 158 and 159 correspond to respective recorders 30, 31, 32, 33 and 34 of Figure 3. The second output terminals of amplifiers 23, 24, 25, 26 and 27 are grounded. Spaced about the periphery of drum 150 is a plurality of pickup brushes 160*a*, 160*b*, . . . 160*n*; 161*a*, 161*b*, . . . 161*n*; 162*a*, 162*b*, . . . 162*n*; 163*a*, 163*b*, . . . 163*n*; and 164*a*, 164*b*, . . . 164*n* which correspond to respective pickups 50*a*, 50*b*, . . . 50*n*; 51*a*, 51*b*, . . . 51*n*; 52*a*, 52*b*, . . . 52*n*; 53*a*, 53*b*, . . . 53*n*; and 54*a*, 54*b*, . . . 54*n* of Figure 3. Brushes 170, 171, 172, 173 and 174, which are electrically grounded, are disposed adjacent respective brushes 155, 156, 157, 158 and 159. This latter group of brushes corresponds to respective obliterator units 41, 42, 43, 44 and 45 of Figure 3. A plurality of commutator segments is mounted on the periphery of drum 150 so as to make contact with the various brushes as drum 150 is rotated. These commutator segments are positioned such that when drum 150 is in a given position there is one commutator segment in electrical contact with each of the brushes. For example, commutator segments 190*a*, 191*a*, 192*a*, 193*a* and 194*a* are positioned under respective brushes 160*a*, 161*a*, 162*a*, 163*a* and 164*a* in a first position. In like manner commutator segments 190*b*, 191*b*, 192*b*, 193*b* and 194*b* are under respective brushes 160*b*, 161*b*, 162*b*, 163*b* and 164*b*. This same form of correspondence holds for the various other commutator segments and brushes as is evident from an inspection of Figures 8, 9 and 10. A plurality of electrical condensers is conveniently positioned within the interior of hollow drum 150 such that corresponding first terminals of each of these condensers are connected to a ground terminal such as shaft 151. The corresponding second terminals of each of these condensers are connected to a respective commutator segment such that one condenser is provided for each commutator segment. One group of these condensers is illustrated in Figure 10 wherein corresponding second terminals of condensers 199*a*, 199*b*, . . . 199*p* are connected to respective commutator segments 194*a*, 194*b*, . . . 194*p*. The corresponding first terminals of each of these condensers are connected to grounded shaft 151.

The operation of the rotating condenser apparatus of Figures 8, 9 and 10 is substantially the same as the operation of the magnetic recording disc apparatus of Figures 3 and 4. Referring again to Figure 2*a* the respective ordinate values of the desired curve between times $t_{15}$ and $t_{28}$ are established on respective potentiometers 79*n*, 79*m*, . . . 79*a*, for example. At time zero a voltage of zero value, time zero of the curve of Figure 2*b*, is applied from the output of amplifier 27 through brush 159 and commutator segment 194*p* to condenser 199*p*. It is assumed that all the condensers 199*a*, 199*b*, . . . 199*p* initially are grounded. At time $t_1$ drum 150 is rotated such that commutator segment 194*p* is adjacent pickup brush 164*a* and commutator segment 194*o* is adjacent recorder brush 159. A second voltage of +2, time $t_1$ of the curve of Figure 2*b*, is then applied to condenser 199*o* and the initial voltage of zero is applied to the input of amplifier 74*a* from condenser 199*p*. This procedure continues in exactly the same manner as the recording and picking up of voltages in the magnetic recording system of Figures 3 and 4. Each of the condensers 199*a*, 199*b*, . . . 199*p* is discharged as it passes grounded brush 174 prior to being recharged by recorder brush 159. It will be observed that this condenser recording system does not result in a continuous output signal because of the fact that the adjacent commutator segments and individual condensers must be electrically insulated from one another. However, by utilizing a large number of individual segments, any given signal can be tuned to the desired degree of accuracy. Moreover, in various computing applications it is desirable to have a point by point output rather than a continuous signal. A low pass filter circuit 200 preferably is connected in the output circuit of amplifier 86 and corresponding low pass filters are connected in the output circuits of each of the other summing amplifiers. As illustrated in Figure 8, a filter 204 is connected in the output circuit of summing amplifier 90. The purpose of these filter circuits is to eliminate high frequency transient signals which may be generated as the commutator segments move in and out of contact with the respective brushes, and also to interpolate between the contact voltages.

When the computing apparatus of this invention is employed as a tuning system it is generally desirable to have a relatively smooth output curve rather than a collection of isolated points. Although a smooth curve can be obtained by suitable filtering circuits positioned in the output circuit of the summing amplifier, it is often desirable to obtain such a curve in a direct manner. The modified form of apparatus illustrated in Figure 11 is adapted to provide a smooth output curve. This apparatus is basically the same as illustrated in Figure 10 with regard to recording brush 159, grounded brush 174 and pickup brushes 164*a*, 164*b*, . . . 164*n* which are connected to the input terminals of respective amplifiers 74*a*, 74*b*, . . . 74*n*. Commutator segments 194*a*, 194*b*, . . . 194*n* are connected to respective condensers 199*a*, 199*b*, . . . 199*n* through respective resistors 201*a*, 201*b*, . . . 201*n*, each having high ohmic value, one megohm, for example. A plurality of second commutator segments 194*a'*, 194*b'*, . . . 194*p'* is mounted on drum 150 such that segment 194*a'* is positioned between segments 194*a* and 194*b*, segment 194*b'* is positioned between segments 194*b* and 194*c*, etc. These latter commutator segments 194*a'*, 194*b'*, . . . 194*p'* are connected to corresponding second terminals of respective condensers 199*a'*, 199*b'*, . . . 199*p'* through respective high ohmic resistors 201*a'*, 201*b'*, . . . 201*p'*. The corresponding first terminals of condensers 199*a'*, 199*b'*, . . . 199*p'* are grounded at shaft 151. The several commutator segments are positioned sufficiently close to one another that the brushes mounted adjacent to the periphery of drum 150 bridge two adjacent commutator segments as drum 150 is rotated whereby each brush is in contact with at least one segment at all times.

The operation of the apparatus illustrated in Figure 11 is substantially the same as the operation of the apparatus illustrated in Figure 10. In the position shown the first ordinate value of the input signal is applied from brush 159 to segment 194*p*. This in turn charges condenser 199*p* through a resistor 201*p*. At the next half interval of time *t* segment 194*o'* is rotated adjacent to brush 159 and segment 194*p* occupies the position initially occupied by segment 194*p'*. At the end of the second half interval of time, segment 194*p* is rotated adjacent to pickup brush 164*a* such that the voltage initially applied to condenser 199*p* is applied to amplifier 74*a*. Between the second and third half intervals of time, pickup brush 164*a* bridges both of segments 194*p* and 194*o'*. This results in a signal being applied to amplifier 74*a* which is the average of the voltages impressed upon condensers 199*p* and 199*o'*. The high valued resistors 201*p* and 201*o'* introduce a high time constant which tends to prevent condensers 199*p* and 199*o'* from assuming a common charge. It should be evident that during rotation of drum 150 the bridging effect which takes place as one brush is in contact with two adjacent segments tends to average out the difference in voltage applied to adjacent condensers such that the output signal is more nearly a smooth curve.

Figure 12B:
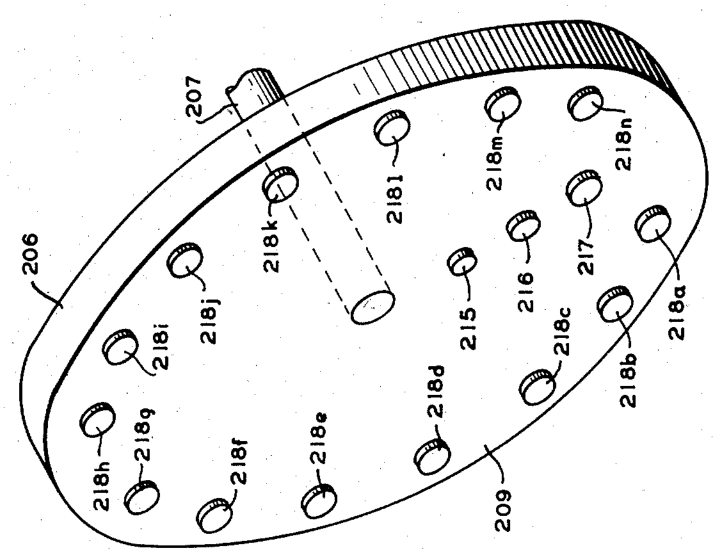
Figure 12A:
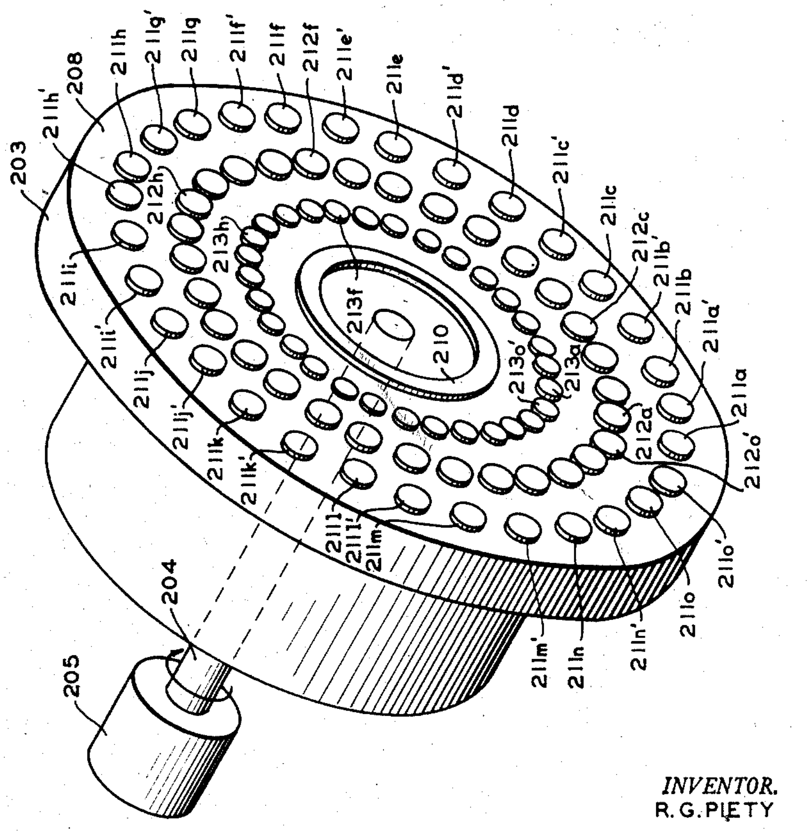

A second arrangement for accomplishing substantially the same averaging effect is illustrated in Figures 12*a*, 12*b*, 13*a* and 13*b*. As shown in Figure 12*a*, a circular plate 203, which is formed of electrically insulating material, is mounted on the drive shaft 204 of a motor 205. A second circular plate 206, constructed of electrically insulating material, Figure 12*b*, is mounted on a stationary shaft 207 such that in operation shafts 204 and 207 are aligned along a common axis whereby the face 208 of plate 203 opposes the face 209 of plate 206 in closely spaced relationship. Plates 203 and 206 are shown in Figures 12*a* and 12*b* in disassembled relation so as to illustrate more clearly the details of construction. A ring 210 of electrically conducting material is mounted on the face 208 of plate 203 and a plurality of first electrical contact buttons 211*a*, 211*a'*, 211*b*, 211*b'*, . . . 211*o*, 211*o'* is mounted on face 208 in equally spaced relationship along an annular path near the periphery of plate 203. A plurality of second electrical contact buttons 212*a*, 212*a'*, 212*b*, 212*b'*, . . . 212*o*, 212*o'* is mounted in spaced relation along a second annular path of smaller diameter and a plurality of third electrical contact buttons 213*a*, 213*a'*, 213*b*, 213*b'*, . . . 213*o*, 213*o'* is mounted along a third annular path of still smaller diameter. A first contact brush 215 is mounted on the face 209 of plate 206 so as to engage ring 210 continuously as plate 203 is rotated. A second contact brush 216 is mounted on plate 206 to engage successively contact buttons 213*a*, 213*a'*, 213*b*, 213*b'*, . . . 213*o*, 213*o'* as plate 203 is rotated, a third contact brush 217 is mounted on plate 206 to engage successively contact buttons 212*a*, 212*a'*, 212*b*, 212*b'*, . . . 212*o*, 212*o'* as plate 203 is rotated; and a plurality of fourth contact brushes 218*a*, 218*b*, . . . 218*n*, is mounted on plate 206 so that each successively engages contact buttons 211*a*, 211*a'*, 211*b*, 211*b'*, . . . 211*o*, 211*o'* as plate 203 is rotated. Brushes 218*a*, 218*b*, . . . 218*n* are spaced such that when plates 203 and 206 occupy first predetermined positions relative to one another, as illustrated, contact brushes 218*a*, 218*b*, . . . 218*n* engage respective contact buttons 211*a*, 211*b*, . . . 211*n*.

Figures 13A, 13B:
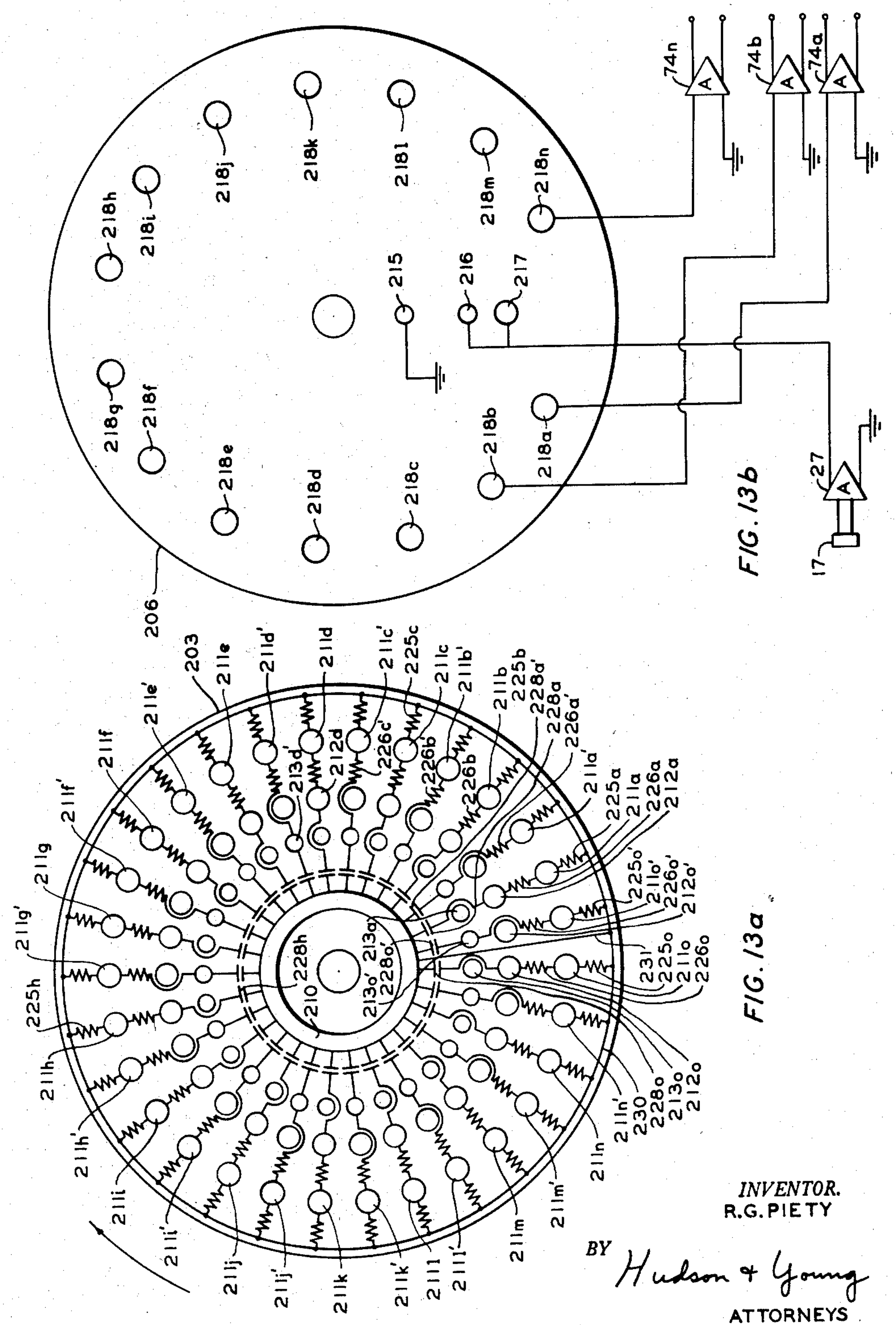

As illustrated in Figure 13*b* the first output terminal of amplifier 27 is applied to brushes 216 and 217, the second output terminal of amplifier 27 being grounded. Brush 215 is maintained at ground potential. Brushes 218*a*, 218*b*, . . . 218*n* are connected to respective first input terminals of amplifier 74*a*, 74*b*, . . . 74*n*.

Figure 13*a* is a schematic representation of the electrical components connected to the various contact buttons and ring 210. Contact buttons 211*a*, 211*a'*, 211*b*, 211*b'*, . . . 211*o*, 211*o'* are connected through respective resistors 225*a*, 225*a'*, 225*b*, 225*b'*, . . . 225*o*, 225*o'* to a lead 230 which in turn is connected to ring 210 by a lead 231. Contact buttons 211*a*, 211*b*, . . . 211*o* also are connected through respective resistors 226*a*, 226*b*, . . . 226*o* to respective contact buttons 212*a*, 212*b*, . . . 212*o*. Contact buttons 211*a'*, 211*b'*, . . . 211*o'* also are connected through respective resistors 226*a'*, 226*b'*, . . . 226*o'* to respective contact buttons 213*a'*, 213*b'*, . . . 213*o'*. Contact buttons 212*a*, 212*b*, . . . 212*o* in turn are connected to corresponding second terminals of respective condensers 228*a*, 228*b*, . . . 228*o*, the respective first terminals of which are connected to ring 210. Contact buttons 213*a'*, 213*b'*, . . . 213*o'* in turn are connected to corresponding second terminals of condensers 228*a'*, 228*b'*, . . . 228*o'*, the respective first terminals of which are connected to ring 210. The several resistors and condensers illustrated in Figure 13*a* are mounted on the back side of plate 203 and are connected to the respective contact buttons and ring 210 by leads which extend through small holes, not shown, in plate 203 adjacent to the several contact buttons.

The output signal from amplifier 27 is applied to brushes 216 and 217 simultaneously. Thus, whenever either of these brushes engages a corresponding contact button, the condenser associated with the button is charged to a voltage representative of the seismic vibrations received at seismometer 17. If it is assumed that plates 203 and 206 are positioned initially as illustrated in the drawing, condenser 228*o* is charged from brush 217. If plate 203 is rotated clockwise until contact button 213*o'* engages brush 216, condenser 228*o'* becomes charged by the output signal from amplifier 27. Thus, in one position brush 216 charges an associated condenser and in the next position brush 217 charges an associated condenser. The voltages initially placed on condensers 228*a*, 228*a'*, 228*b*, 228*b'*, . . . 228*o*, 228*o'*, by brushes 216 and 217 subsequently are applied to pickup brushes 218*a*, 218*b*, . . . 218*n*. It should be noted that a potential dividing network is connected between each condenser and the grounded lead 230. These networks comprise the two resistors associated with each of the outer ring of contact buttons. The charge initially applied to the condensers continuously leaks off to ground through the high resistors and the output signal is obtained from the midpoint of this voltage dividing network. Because of the high ohmic value of each resistor, 10 megohms, for example, the charge leaks off the several condensers very slowly; an averaging effect is produced. It should be noted that there are only half as many pickup brushes as there are output contact buttons. The several contact buttons are positioned sufficiently close to one another that a bridging effect by the pickup brushes results substantially as described in conjunction with Figure 11. It further should be noted that the grounded contact brush 164*o* illustrated in Figure 11 is not utilized in the apparatus of Figures 12 and 13. This grounded contact brush also can be eliminated in the other rotating condenser configurations if desired. It is not necessary that the condensers be discharged before being recharged by the outputs of the seismic amplifiers because the output voltages therefrom are impressed on the condensers irrespective of the previous voltages thereon.

A second important application of the computer system of this invention resides in the division of one polynomial by another. For example, let $Q(x)$ represent the quotient of P($x$) divided by D($x$) where P($x$) is represented as $$P(x)=P_0+p_1x+p_2x^2+\ldots+p_nx^n \quad (18)$$

and D($x$) is represented as $$D(x)=d_0+d_1x+d_2x^2+\ldots+d_nx^n \quad (19)$$

This division can be expressed as $$Q(x)=\frac{P(x)}{D(x)}=P(x)\cdot\frac{1}{D(x)} \quad (20)$$

Thus the division of P($x$) by D($x$) is the equivalent of multiplying P($x$) by the reciprocal of D($x$). Division is accomplished in accordance with this invention by first obtaining the reciprocal of the divisor and then multiplying the dividend by this reciprocal of the divisor.

The apparatus illustrated in Figure 14 represents one embodiment of apparatus capable of performing these dual operations. A first rotating drum 240 is provided with spaced commutator segments **241*a*, 241*b*, . . . 241*h* mounted on the periphery thereof. A voltage source 242 is connected between segment 241*a* and a grounded reference point, which can be the shaft 239 about which drum 240 rotates. Condensers 243*b*, 243*c*, . . . 243*h* are connected between respective segments 241*b*, 241*c*, . . . 241*h* and grounded shaft 239. Brushes 244*a*, 244*b*, . . . 244*h* are positioned about the periphery of drum 240 so as to make contact with the individual commutator segments as drum 240 is rotated. These brushes are spaced such that in a given position each brush is in contact with one of the commutator segments. Brushes 244*b*, 244*c*, . . . 244*h* are connected to first input terminals of respective amplifiers 245*b*, 245*c*, . . . 245*h*, the second input terminals of which are grounded. The output terminals of amplifiers 245*b*, 245*c*, . . . 245*h* are connected across the end terminals of respective potentiometers 246*b*, 246*c*, . . . 246*h* which have grounded center taps. The contactors of potentiometers 246*b*, 246*c*, . . . 246*h* are connected to the first input terminal of a summing amplifier 248 through respective resistors 247*b*, 247*c*, . . . 247*h*. Amplifier 248 is constructed of an odd number of vacuum tube amplifier stages such that the output signal is 180° out of phase from the input signal. The output terminals of amplifier 248 are connected to the input terminals of a recorder 251. A lead 252 connects one output terminal of filter 249 to brush 244*a*, the second output terminal of filter 249** being grounded.

A second rotating drum 255 is provided with spaced commutator segments **256*a*, 256*b*, . . . 256*h* mounted on the periphery thereof. Condensers 257*a*, 257*b*, . . . 257*h* are connected between respective segments 256*a*, 256*b*, . . . 256*h* and a point of ground potential, which can be the shaft 254 about which drum 255 rotates. Brushes 258*a*, 258*b*, . . . 258*h* are mounted adjacent the periphery of drum 255 so as to engage the segments as drum 255 is rotated. These brushes are spaced such that there is a brush in contact with each segment at a given position. Brushes 258*a*, 258*b*, . . . 258*h* are connected to first input terminals of respective amplifiers 260*a*, 260*b*, . . . 260*g*, the second input terminals of which are grounded. The output terminals of amplifiers 260*a*, 260*b*, . . . 260*g* are connected across the end terminals of respective potentiometers 261*a*, 261*b*, . . . 261*g* which have grounded center taps. The contactors of potentiometers 261*a*, 261*b*, . . . 261*g* are connected to the first input terminal of a summing amplifier 263 through respective resistors 262*a*, 262*b*, . . . 262*g*. The output terminals of amplifier 263 are connected to the input terminals of a filter circuit 264 and the output terminals of filter 264 are connected to the input terminals of a recorder 265**. The filter is not used when the apparatus is employed to carry out purely mathematical operations.

Drum 240 and its associated components are employed to obtain the reciprocal of polynomial (19). This is accomplished by setting the contactors of potentiometers **246*h*, 246*g*, 246*f*, 246*e*, 246*d*, 246*c* and 246*b* in accordance with the respective values of coefficients $d_1$, $d_2$, $d_3$, $d_4$, $d_5$, $d_6$ and $d_7$. Voltage source 242 has a value representative of unity. In operation, drum 240 is rotated in a clockwise direction. Initially condensers 243*b*, 243*c*, . . . 243*h* are discharged such that zero or ground potential appears on each. In the illustrated position the voltage of source 242 is applied directly to recorder 251 over lead 252 so that at time zero the value recorded is unity. At the end of the first time interval, drum 240 is rotated so that segment 241*a* is in engagement with brush 244*h* so that the voltage of source 242 is applied to the amplifier circuit 245*h* which multiplies this unity voltage by the value $d_1$. The output voltage of amplifier 248 is therefore representative of $-d_1$, and this value is applied both to recorder 251 and to condenser 243*b* which is in engagement with brush 244*a*. At the end of the second time interval, segment 241*a* is rotated to be in engagement with brush 244*g*. This applies a unity voltage to amplifier 245*g*, which voltage is in turn multiplied by the quantity $d_2$ set on potentiometer 246*g*. At the same time the voltage $-d_1$ previously applied to condenser 243*b* is applied to the input of amplifier 245*h*. This $-d_1$ voltage is in turn multiplied by the quantity $d_1$ set on potentiometer 246. Thus, the output of amplifier 248 is minus the sum of these two last-mentioned products or $-(d_2-d_1^2)$. This latter voltage is applied both to recorder 251 and to condenser 243*c* which is in engagement with brush 244*a* at this time. This same procedure is repeated for each subsequent time interval whereby the output voltage represents the sum of the various input quantities multiplied by the several 246 potentiometers. At the end of the third time interval the output voltage from amplifier 248 is represented by $-(d_3-2d_1d_2-d_1^3)$. It can readily be established that the voltage values recorded at 251** represent the reciprocal of polynomial (19). These values also can be expressed as a polynomial as follows:

$$\frac{1}{D(x)}=1-d_1x-(d_2-d_1^2)x^2-(d_3-2d_1d_2-d_1^3)x^3-\ldots$$

The accuracy of polynomial (21) can be established by multiplying this polynomial by polynomial (19). This multiplication is as follows:

$$\begin{array}{lll}
\multicolumn{3}{l}{1-d_1x-(d_2-d_1^2)x^2-(d_3-2d_1d_2-d_1^3)x^3-\ldots} \\
1+d_1x & +d_2x^2 & +d_3x^3+\ldots \\
\hline
1+d_1x & +d_2x^2 & +d_3x^3 \\
-d_1x & -d_1^2x^2 & -d_1d_2x^3 \\
 & -d_2x^2 & -d_1d^2x^3 \\
 & +d_1^2x^2 & +d_1^3x^3 \\
 & & -d_3x^3 \\
 & & +2d_1d_2x^3 \\
 & & -d_1^3x^3 \\
\hline
1+0 & +0 & +0
\end{array}$$

Since the product of the two polynomials is unity it is known that they are reciprocals. This is a purely formal procedure; sometimes the remainder is large no matter how many zeros follow the unity term. In this case the denominator polynomial must be factored and the reciprocal of the factors with roots greater than one are evaluated by division to the left so that the power series contains negative exponents. The other factor is evaluated by division to the right so that positive exponents are obtained, as in (19).

The output signal from amplifier 248 is applied by a lead 266 to brush **258*h*. Drum 255 is rotated in a counterclockwise direction. The contactors of potentiometer 261*a*, 261*b*, . . . 261*g* are set in accordance with the coefficients of polynomial (18), that is, the values $p_1$, $p_2$, . . . $p_7$ are set on respective potentiometers 261*a*, 261*b*, . . . 261*g*. In this manner the reciprocal polynomial (21) is applied to brush 258*a*, and the output signal applied to recorder 265 represents the product of polynomial (21) by polynomial (18). This latter operation is identical to the multiplication operation previously described in conjunction with Figure 8. It should readily be apparent that the number of condensers employed with drum 260** can be increased to obtain the reciprocal to the desired degree of accuracy, the larger the number of condensers utilized the larger the number of terms obtained.

Figure 15A:
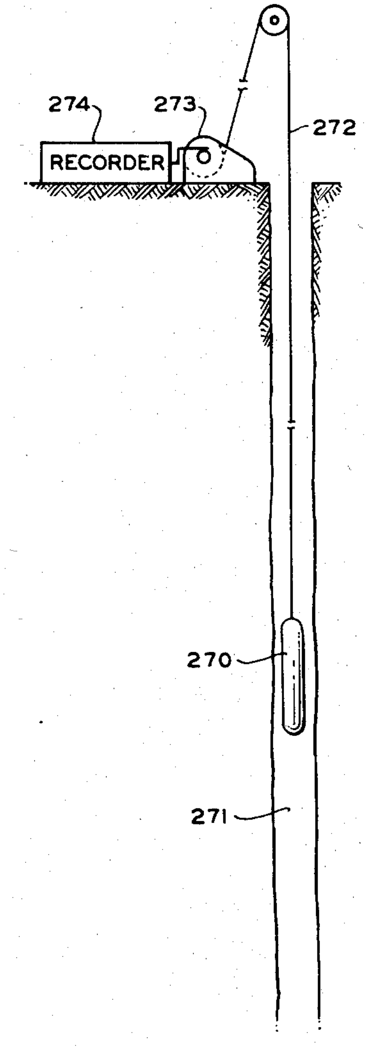
Figure 15B:
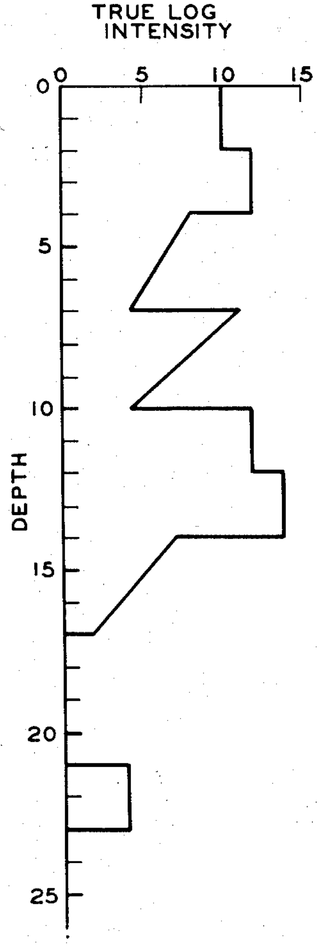
Figure 15C:
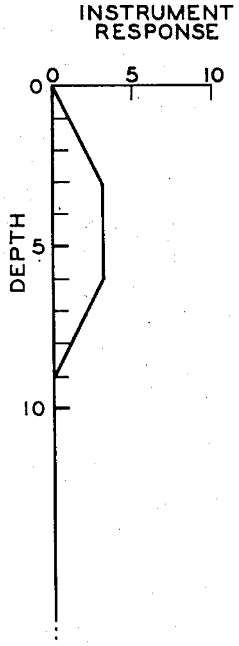
Figure 15D:
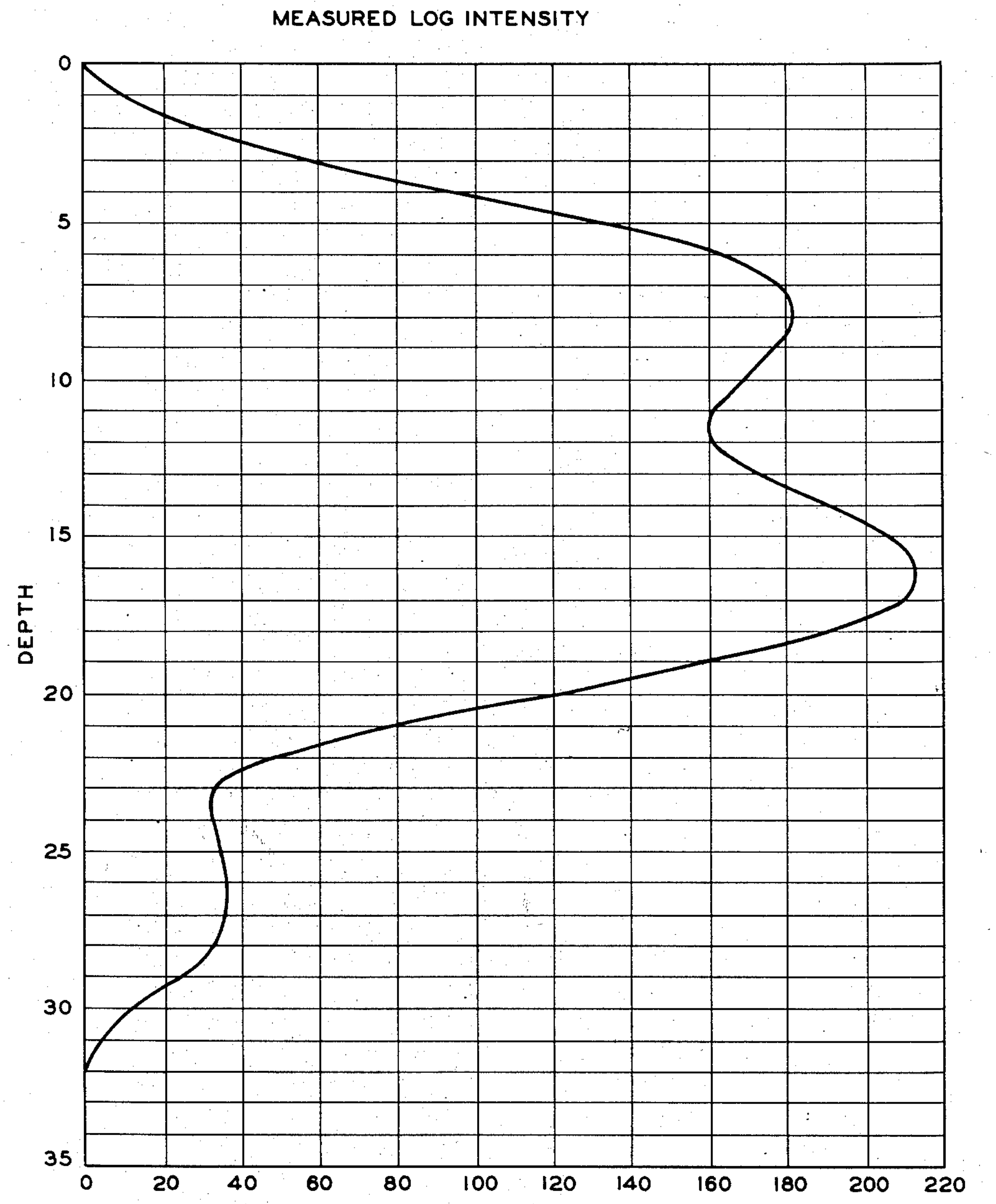

One particular example of the use of the polynomial division system of this invention resides in interpreting gamma ray well logs. Such a logging system is illustrated schematically in Figure 15*a* wherein a radiation detector 270 is lowered into a bore hole 271 by a cable 272 which is attached at its upper end to a reel 273. Cable 272 is provided with electrical leads which extend to a recorder 274 by a suitable commutator and brush arrangement attached to reel 273. By slowly lowering or raising detector 270 in bore hole 271 a radiation intensity signal is obtained on recorder 274 which may be somewhat as illustrated in Figure 15*d*, for example. In Figure 15*d* the vertical axis represents the depth to which detector 270 is suspended in the bore hole and the horizontal axis represents the magnitude of the detected gamma ray signal. It is of course known that the curve of Figure 15*d* does not represent the true parameter of the bore hole but rather represents a measured parameter which is influenced to a certain extent by the response characteristic of detector 270. In the example illustrated it is assumed that detector 270 records a curve such as illustrated in Figure 15*c* when passing a single bed of predetermined strength. It further is assumed that detector 270 responds to a combination of thin beds by merely adding the contributions from each bed in accordance with its strength and the geometrical weight factor of Figure 15*c*. This is in accordance with postulate (6) previously discussed. If these properties are assumed it becomes possible to evaluate by simple numerical means the true log of the bore hole formations which is represented by Figure 15*b*. In order to explain this method of obtaining the true log from the measured log it is convenient to describe a system of obtaining the measured log from the true log and noting the inverse.

For purposes of discussion it is assumed that variations of the parameter in one-foot intervals are sufficient to resolve the desired detail of the formation. This process can be explained in conjunction with Table III which follows:

This polynomial completely defines a well whose parameter values are known at one-foot intervals and is referred to hereinafter as the true well polynomial. The coefficients of polynomial (23) appear in the top horizontal line of Table III. By forming a table of values in like manner from the curve of Figure 15*c* there is obtained the instrument polynomial.

$$1-2x-3x^2-3x^3-3x^4-3x^5-2x^6-x^7 \quad (24)$$

The coefficients of this second polynomial are written in the second horizontal line of Table III. Thus, the measured signal obtained at any given depth within the well obviously is the product of the parameter of the well at that depth multiplied by the instrument response. The total measured parameter is, therefore, the sum of these individual responses, and this in turn is merely the product of the true polynomial by the instrument polynomial. This multiplication is illustrated in Table III wherein the products of the polynomial response coefficients multiplied by each coefficient of the true parameter are written in the third and following horizontal lines. The product of the two polynomials is equal to the sum of these individual products and is expressed by the bottom horizontal line, the coefficients of this product polynomial forming the values of the curve of Figure 15*d*. The intensity values are in arbitrary units for illustrative purposes.

Therefore, the true log of bore hole 271 can be obtained from the measured parameter polynomial of Figure 15*d* by dividing this measured polynomial by the instrument response polynomial of Figure 15*c*. This is expressed mathematically as follows:

$$\text{True log}=\frac{\text{measured polynomial}}{\text{instrument polynomial}}$$

$$=\text{measured polynomial}\times\frac{1}{\text{instrument polynomial}}$$

In practice the reciprocal of the instrument polynomial is first obtained by the apparatus illustrated in the left-hand side of Figure 14. The coefficients of the reciprocal of the instrument polynomial are established on the potentiometers of any one of the described multiplying configurations and the measured parameter is applied directly as the input signal. This results in the multiplication of the measured parameter by the reciprocal of the instrument response parameter and the product represents the true well parameter.

TABLE III

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 10 | 10 | 12 | 12 | 12 | 7 | 6 | 11 | 9 | 7 | 12 | 12 | 14 | 14 | 14 | 6 | 4 | 2 | | | | 4 | 4 | 4 | | | | | | | | (True Log) |
| 1 | 2 | 3 | 3 | 3 | 3 | 2 | 1 | | | | | | | | | | | | | | | | | | | | | | | | (Instrument Response) |
| 10 | 20 | 30 | 30 | 30 | 30 | 20 | 10 | | | | | | | | | | | | | | | | | | | | | | | | |
| | 10 | 20 | 30 | 30 | 30 | 30 | 20 | 10 | | | | | | | | | | | | | | | | | | | | | | | |
| | | 12 | 24 | 36 | 36 | 36 | 36 | 24 | 12 | | | | | | | | | | | | | | | | | | | | | | |
| | | | 12 | 24 | 36 | 36 | 36 | 36 | 24 | 12 | | | | | | | | | | | | | | | | | | | | | |
| | | | | 12 | 24 | 36 | 36 | 36 | 36 | 24 | 12 | | | | | | | | | | | | | | | | | | | | |
| | | | | | 7 | 14 | 21 | 21 | 21 | 21 | 14 | 7 | | | | | | | | | | | | | | | | | | | |
| | | | | | | 6 | 12 | 18 | 18 | 18 | 18 | 12 | 6 | | | | | | | | | | | | | | | | | | |
| | | | | | | | 11 | 22 | 33 | 33 | 33 | 33 | 22 | 11 | | | | | | | | | | | | | | | | | |
| | | | | | | | | 9 | 18 | 27 | 27 | 27 | 27 | 18 | 9 | | | | | | | | | | | | | | | | |
| | | | | | | | | | 7 | 14 | 21 | 21 | 21 | 21 | 14 | 7 | | | | | | | | | | | | | | | |
| | | | | | | | | | | 12 | 24 | 36 | 36 | 36 | 36 | 24 | 12 | | | | | | | | | | | | | | |
| | | | | | | | | | | | 12 | 24 | 36 | 36 | 36 | 36 | 24 | 12 | | | | | | | | | | | | | |
| | | | | | | | | | | | | 14 | 28 | 42 | 42 | 42 | 42 | 28 | 14 | | | | | | | | | | | | |
| | | | | | | | | | | | | | 14 | 28 | 42 | 42 | 42 | 42 | 28 | 14 | | | | | | | | | | | |
| | | | | | | | | | | | | | | 14 | 28 | 42 | 42 | 42 | 42 | 28 | 14 | | | | | | | | | | |
| | | | | | | | | | | | | | | | 6 | 12 | 18 | 18 | 18 | 18 | 12 | 6 | | | | | | | | | |
| | | | | | | | | | | | | | | | | 4 | 8 | 12 | 12 | 12 | 12 | 8 | 4 | | | | | | | | |
| | | | | | | | | | | | | | | | | | 2 | 4 | 6 | 6 | 6 | 6 | 4 | 2 | | | | | | | |
| | | | | | | | | | | | | | | | | | | | | | 4 | 8 | 12 | 12 | 12 | 12 | 8 | 4 | | | |
| | | | | | | | | | | | | | | | | | | | | | | 4 | 8 | 12 | 12 | 12 | 12 | 8 | 4 | | |
| | | | | | | | | | | | | | | | | | | | | | | | 4 | 8 | 12 | 12 | 12 | 12 | 8 | 4 | |
| 10 | 30 | 62 | 96 | 132 | 163 | 178 | 182 | 176 | 169 | 161 | 161 | 174 | 190 | 206 | 213 | 209 | 190 | 158 | 120 | 78 | 48 | 32 | 32 | 34 | 36 | 36 | 32 | 24 | 12 | 4 | (Measured Log) |

The true log of the well as illustrated in Figure 15*b* is expressed in terms of the algebraic polynomial:

$$10-10x-12x^2-12x^3-12x^4-7x^5-6x^6-11x^7-9x^8-7x^9-12x^{10}-12x^{11}-14x^{12}-14x^{13}-14x^{14}-6x^{15}-4x^{16}-2x^{17}-4x^{21}-4x^{22}-4x^{23} \quad (23)$$

In order to reduce the number of amplifiers in the apparatus thus far described, a modified form of the apparatus is illustrated schematically in Figures 16, 17, 18 and 19. With reference to Figure 16, a first drum 326 is mounted on a rotating shaft 327. Shaft 327 is connected through a gear box 328 to the drive shaft 329 of a constant speed motor 330 to provide rotation of disc 326 at an angular velocity ω. A stationary plate 331 is mounted adjacent one face of disc 326. Disc 326 has a plurality of equally spaced electrical contacts 350a, 350b, . . . 350h, see Figure 17, mounted on the face thereof adjacent plate 331. Plate 331 has a plurality of corresponding electrical contacts 351a, 351b, . . . 351h mounted on the face thereof adjacent disc 326, see Figure 4. At the illustrated position, contacts 350a, 350b, . . . 350h are in engagement with respective contacts 351a, 351b, . . . 351h.

Referring again to Figure 16, shaft 327 extends through a central opening in plate 331. A bearing assembly 333 can be disposed in this opening. A second disc 334, which is generally similar to disc 326, is likewise mounted on shaft 327 for rotation therewith. Disc 326 has a plurality of electrical contacts on one face thereof which correspond to the contacts on the face of disc 326. A stationary shaft support 335 is positioned adjacent the face of disc 334 having the contacts thereon. Support 335 has a pair of contacts on the face thereof adjacent disc 334. These contacts are positioned in the manner described hereinafter in conjunction with Figure 18. Shaft 327 extends from support plate 335 to a speed reduction gear box 336. The output shaft 337 from gear box 336 is connected to a third disc 338. Disc 338 has a plurality of contacts on one face thereof. These contacts are also described in detail hereinafter in conjunction with Figure 18. A support 339 is mounted adjacent the face of disc 338 having the contacts thereon. Support 339 has a pair of contacts thereon which are also described hereinafter in conjunction with Figure 18.

The electrical circuit elements associated with the apparatus of Figure 16 are illustrated schematically in Figure 18. The first output terminal of amplifier 23 of Figure 3, for example, is connected to an input terminal 341 which is connected to contact 351a of stationary plate 331. The second output terminal of amplifier 23 is grounded. A plurality of capacitors 353a, 353b, . . . 353h is mounted in disc 326 to rotate therewith. First terminals of capacitors 353a, 353b, . . . 353h are connected to respective contacts 350a, 350b, . . . 350h. The corresponding second terminals of the capacitors are grounded. Contacts 351b, 351c, . . . 351h of plate 331 are connected to respective first input terminals of amplifiers 355b, 355c, . . . 355h. The second input terminals of these amplifiers are grounded. The end terminals of first potentiometers 356b, 356c, . . . 356h are connected to respective output terminals of amplifiers 355b, 355c, . . . 355h. Second potentiometers 357b, 357c, . . . 357h are connected in parallel with respective first potentiometers 356b, 356c, . . . 356h. Third potentiometers 358b, 358c, . . . 358h are also connected in parallel with respective first potentiometers 356b, 356c, . . . 356h.

One of the amplifiers, 355b for example, is illustrated in detail in Figure 19. Contact 351b of Figure 18 is connected to a terminal 385 which is connected to the control grid of a triode 386. The cathode of triode 386 is connected to ground through a resistor 389. The anode of triode 386 is connected through a resistor 398 to a positive potential terminal 399. The cathode of triode 386 is also connected directly to the cathode of a second triode 387. The anode of triode 387 is connected through a resistor 402 to a positive potential terminal 403. The anodes of triodes 386 and 387 are connected to the control grids of respective triodes 400 and 404. The signals applied to these latter triodes are thus 180° out of phase with one another. The cathodes of triodes 400 and 404 are connected to ground through respective resistors 401 and 405. The positive terminal of a voltage source 406 is connected to the anodes of triodes 400 and 404, the negative terminal of source 406 being grounded. The cathode of triode 404 is connected to first end terminals of potentiometers 356b, 357b and 358b, and the cathode of triode 400 is connected to second end terminals of potentiometers 356b, 357b and 358b. The center taps of these potentiometers are grounded. The signals at the cathodes of triodes 400 and 404 are 180° out of phase with one another so that the settings of the potentiometers can accommodate both positive and negative terms.

The contactors of potentiometers 358b, 358c, . . . 358h in Figure 18 are connected through respective isolating resistors 364b, 364c, . . . 364h to the first input terminal of a summing amplifier 365. The second input terminal of amplifier 365 is connected to ground. The first output terminal of amplifier 365 is connected to a contact 367 which is mounted on plate 335 of Figure 16. A plurality of capacitors 377a, 377b, . . . 377h is mounted in disc 34. First end terminals of capacitors 377a, 377b, . . . 377h are connected to respective contacts 375a, 375b, . . . 375h which are mounted on the face of disc 334 in equally spaced relationship. Contacts 375a, 375b, . . . 375h are mounted on the face of disc 334 in the same manner that contacts 350a, 350b, . . . 350h are mounted on disc 322, as illustrated in Figure 17. A contact 368, which is mounted on plate 335, is illustrated in engagement with contact 375h. Contact 368 is connected through a summing resistor 376 to the first input terminal of a summing amplifier 395. The second input terminal of amplifier 395 is connected to ground. The output terminals of amplifier 395 are connected to the respective input terminals of a low frequency pass filter circuit 396. The output terminals of filter circuit 396 are connected to the respective input terminals of a recorder 397.

The contactors of potentiometers 357b, 357c, . . . 357h are connected through respective isolating resistors 362b, 362c, . . . 362h to the first input terminal of a summing amplifier 363. The second input terminal of amplifier 363 is connected to ground. The first output terminal of amplifier 363 is connected to a contact 400 which is mounted on plate 339 of Figure 16. The second output terminal of amplifier 363 is connected to ground. A plurality of capacitors 388a, 388a', 388b, 388b', . . . 388h' is mounted in disc 338. First terminals of these capacitors are connected to respective terminals 380a, 380a', 380b, 380b', . . . 380h' which are mounted on the face of disc 338 in the same manner that contacts 350a, 350b, . . . 350h are mounted on disc 326. The second terminals of the capacitors are connected to ground. A contact 401 is mounted on plate 339 to engage contact 380h when disc 338 is in the position illustrated in Figure 18. Contact 401 is connected through a summing resistor 389 to the first input terminal of summing amplifier 395.

The contactors of potentiometers 356b, 356c, . . . 356h are connected through respective isolating resistors 360b, 360c, . . . 360h to the first input terminal of a summing amplifier 361. The second input terminal of amplifier 361 is connected to ground. The first output terminal of amplifier 361 is connected through a summing resistor 366 to the first input terminal of summing amplifier 395. The second output terminal of amplifier 361 is connected to ground.

The operation of the signal transforming apparatus thus far described will first be explained with the use of only rotating discs 326 and 334. It is assumed that disc 338 is removed from the circuit of Figure 18. Potentiometers 357b, 357c, . . . 357h and amplifier 363 can also be removed from the circuit by suitable switches, not shown. The output voltage signal generated by vibrations incident upon seismometer 13 is amplified by amplifier 23 and applied to contact 351a. As disc 326 rotates in the illustrated clockwise direction at an angular velocity ω, the output voltage of amplifier 23 is applied successively to the capacitors rotated into engagement with contact **351*a*. The operation of the apparatus to detect the time of arrival of the reflected vibrations from bed 19 at seismometer 14** is substantially as previously described.

The values of the ordinates of the curve of Figure 2*a* (reversed) at each sequential time interval are set on respective potentiometers **356*b*, 356*c*, . . . 356*h*, 358*b*, 358*c*, . . . 358*h*. Thus, at time $t_{28}$ the ordinate of the curve has a value of zero and at time $t_{27}$ the ordinate has a value of +2. These ordinate values are established on the corresponding potentiometers in the conventional manner for multiplication. For example, let it arbitrarily be assumed that the positive end terminal of potentiometer 356*c* is at +5 volts and the negative end terminal of the potentiometer is at −5 volts. In order to establish a value of +2 on potentiometer 356*c*, the contactor thereof is positioned two-fifths the distance between the grounded center tap and the positive end terminal. The voltage appearing at the contactor of the potentiometer is thus +2 volts. If the voltage at the positive terminal of potentiometer 356*c*** should increase to +25 volts, for example, the voltage of the contactor is increased by a factor of 5 to +10 volts.

In operation, at time $t_1$ contact **350*a* is rotated into engagement with contact 351*b* and contact 350*h* is rotated into engagement with contact 351*a* so that the voltage initially applied to capacitor 353*a* is applied to the first input terminal of amplifier 355*b*. This signal, which represents a voltage of zero in the example, is amplified and applied across the end terminals of potentiometers 356*b* and 358*b*. It should be noted that the contactor of potentiometer 356*b* initially is positioned at a value corresponding to zero volts. This has the effect of multiplying the zero output signal from amplifier 355*b* by zero which results in an output voltage being applied to the input terminal of summing amplifier 361 which is representative of zero times zero or zero. This zero voltage is also applied through summing amplifier 395 and filter 396 to the input of recorder 97. At this same time, the zero output voltage from amplifier 355*b* is applied across potentiometer 358*b*. The contactor of potentiometer 358*b*** initially is set at a value corresponding to time $t_{21}$ which represents zero volts in the curve of Figure 2*a*. The multiplication of zero times zero results in a product of zero which is applied through summing amplifier 365 and contacts 367 and **375*a* to capacitor 377*a*. This zero voltage signal is stored on capacitor 377*a* until disc 334 rotates to the position such that contact 375*a* is in engagement with contact 368. At this later time, the voltage initially applied to capacitor 377*a* is applied through summing amplifier 395 and filter 396 to recorder 397**.

At time $t_2$ disc 326 is rotated such that contact **350*a* is in engagement with contact 351*c*. The zero voltage initially stored on capacitor 353*a* is then multiplied by the zero contactor setting on potentiometer 356*c* which results in a zero output voltage being applied through resistor 360*c* to summing amplifier 361**. At this same time, the second ordinate of the curve of Figure 2*b*, which has a value of +2 and which was applied to capacitor **353*h* at time $t_1$, is applied to amplifier 355*b*. This voltage signal of +2 is multiplied by the +1 contactor setting of potentiometer 56*b* and applied through resistor 60*b* to summing amplifier 61. A corresponding signal, zero plus +2, is likewise stored on capacitor 377*g* of disc 334. It should thus be apparent that as disc 326 makes seven-eights of one revolution, a signal is applied through summing amplifier 361 to summing amplifier 395 which represents the sum of the products of the quantities multiplied by potentiometers 356*b*, 356*c*, . . . 356*h*. At each increasing time interval up to $t_7$ one additional quantity is summed by amplifier 361. At the next time interval, the voltage initially stored on capacitor 377*a* is removed by contact 368 and added to the output of summing amplifier 361. As discs 326 and 334 continue to rotate, the signals stored initially on the capacitors of disc 334 are removed by contact 368**. This multiplication and summation process is identical to that shown in Table I.

The use of the third disc 338 rotating at half the angular velocity of discs 326 and 334 and having twice the number of capacitors further reduces the number of amplifiers required for a predetermined tuning interval. As illustrated in Figure 18, the output voltages of each of the amplifiers are applied across three potentiometers. With this arrangement, the curve illustrated in Figure 2*a* between times $t_{28}$ and $t_{15}$ can be divided into twenty-one parts instead of fourteen parts as previously described. The last seven ordinate values are then set on respective potentiometers **356*b*, 356*c*, . . . 356*h* in reverse order. The middle seven ordinate values are set on respective potentiometers 358*b*, 358*c*, . . . 358*h* in reverse order. The first seven ordinate values are set on respective potentiometers 357*b*, 357*c*, . . . 357*h* in reverse order. From the multiplication operation previously described it should be evident that the output signal from disc 338 must be delayed twice the time interval that the output signal from disc 334 is delayed. This is readily accomplished by rotating disc 338 at one-half the angular velocity of discs 326 and 334. In this manner the first fourteen terms of the product appear on recorder 397 before the first signal is applied to recorder 397 from disc 338. The additional capacitors are needed to provide a capacitor in contact with terminal 100 at each interval. In corresponding manner, a fourth disc can be provided to rotate at one-fourth the speed of rotation of discs 326 and 334. This requires still more capacitors. If a fourth disc is provided, an additional potentiometer is connected to the output of each of amplifiers 355*b*, 355*c*, . . . 355*h*. An additional summing amplifier corresponding to amplifiers 361, 363 and 365 is provided to sum the outputs of the four potentiometers. This summed signal is then applied to the fourth disc and the output signal therefrom is likewise applied to summing amplifier 395**.

In Figure 20 there is shown an arrangement which accomplishes the same delay as disc 338. The apparatus of Figure 20 comprises a pair of discs 405 and 406 which are rotated at the same speed as discs 326 and 334. The output signal from summing amplifier 363 is applied to a terminal 407 which is connected to a stationary contact 408. Disc 405 is provided with a set of equally spaced contacts **410*a*, 410*b*, . . . 410*h* which correspond to the contacts on discs 326 and 334. A plurality of capacitors 411*a*, 411*b*, . . . 411*h* is carried by disc 405. First terminals of capacitors 411*a*, 411*b*, . . . 411*h* are connected to respective contacts 410*a*, 410*b*, . . . 410*h*. The second terminals of these capacitors are connected to ground. A second stationary contact 412 is positioned to engage contact 410 when disc 405 occupies the illustrated position with contact 410*a* being in engagement with contact 408. Contact 412 is connected to a stationary contact 413 mounted adjacent disc 406. Disc 406 is provided with a plurality of equally spaced contacts 415*a*, 415*b*, . . . 415*h*. A plurality of capacitors 416*a*, 416*b*, . . . 416*h* is carried by disc 406. First terminals of capacitors 416*a*, 416*b*, . . . 416*h* are connected to respective contacts 415*a*, 415*b*, . . . 415*h*. The second terminals of these capacitors are connected to ground. A stationary contact 417 is positioned to engage contact 415*h* when disc 406 is in the illustrated position with contact 415*a* being in engagement with contact 413. Contact 417 is connected to an output terminal 418 which is connected to the first input terminal of summing amplifier 395 of Figure 18. A voltage initially stored on capacitor 411*a* from terminal 407, for example, is removed by contact 412 following seven-eighths of a revolution of disc 405. This signal is applied to capacitor 416*b* which is in engagement with contact 413 at this time. Following an additional seven-eighths revolution of the two discs, the signal is removed by contact 417 and applied to summing amplifier 395. Thus, the two discs 405 and 406 rotating simultaneously store a voltage the same length of time as does disc 338 of Figure 18 which is rotated at one-half the angular velocity. The arrangement of Figure 20 eliminates the need for gear box 336, but requires an additional storage disc 338**.

In Figure 21 there is shown a magnetic recording embodiment of signal storage apparatus which can be employed in place of the capacitor signal storage means previously described. A disc 420 is rotated by the drive shaft 327′ of a motor 330′. An annular strip of magnetizable material 421 is mounted on the face of disc 420. Eight equally spaced recording and reproducing heads **423*a*, 423*b*, . . . 423*h* are mounted adjacent strip 421. Head 423*a* is electrically connected to the output of amplifier 23 in Figure 3. Reproducing heads 423*b*, 423*c*, . . . 423*h* are connected to the respective input terminals of amplifiers such as 355*b*, 355*c*, . . . 355*h* of Figure 18. An obliterating unit 424 is disposed adjacent strip 421 between heads 423*a* and 423*h*. A source of relatively high frequency alternating current 425 is connected to obliterating unit 424. Disc 420 and the reproducing heads function to store electrical signals in the same manner as disc 326** of Figure 16. A unit of this type can be employed in place of any or all of the discs of Figure 16.

In Figure 22 there is shown an embodiment of signal storage and reproducing apparatus incorporating electrical delay lines. The first output terminal of amplifier 23 of Figure 3 is connected to the first input terminal 430 of a tapped electrical delay line 431. The second input terminal of delay line 431 is connected to ground. Delay line 431 is provided with a plurality of output leads **435*a*, 435*b*, . . . 435*h*. Line 431 can be any known type of delay line capable of providing a plurality of output signals which are delayed in phase by predetermined equally spaced intervals. The output signal at lead 435*b* is delayed in phase from the signal appearing at lead 435*a*** by time corresponding to one of the intervals indicated in Figure 2*a*. Leads **435*a*, 435*b*, . . . 435*h* are connected to first end terminals of respective potentiometers 434*a*, 434*b*, . . . 434*h*. The second end terminals of these potentiometers are connected to ground. Second potentiometers 433*a*, 433*b*, . . . 433*h* are connected in parallel with respective potentiometers 434*a*, 434*b*, . . . 434*h*. Third potentiometers 432*a*, 432*b*, . . . 432*h* are also connected in parallel with respective potentiometers 434*a*, 434*b*, . . . 434*h*. These three groups of potentiometers correspond to the parallel connected potentiometers in the output circuits of the amplifiers 355*b*, 355*c*, . . . 355*h*** of Figure 18. The contactors of these potentiometers are set in the same manner as the corresponding potentiometers in Figure 18 except that the potentiometers of Figure 22 do not distinguish between positive and negative coefficients. The contactors of the potentiometers are set without regard to the mathematical sign of the particular ordinate of the signal to be recognized.

The contactors of potentiometers **432*a*, 432*b*, . . . 432*h* are connected through respective isolating resistors 437*a*, 437*b*, . . . 437*h* to respective switch blades 438*a*, 438*b*, . . . 438*h*. Switch blades 438*a*, 438*b*, . . . 438*h* are moved into engagement with respective terminals 439*a*, 439*b*, . . . 439*h* when the coefficients set on respective potentiometers 432*a*, 432*b*, . . . 432*h* are positive. Terminals 439*a*, 439*b*, . . . 439*h* are connected to a lead 441 which is connected to the first input terminal of a summing amplifier 445. The second input terminal of amplifier 445 is connected to ground. Switch blades 438*a*, 438*b*, . . . 438*h* are connected to respective terminals 440*a*, 440*b*, . . . 440*h* when the coefficients set on respective potentiometers 432*a*, 432*b*, . . . 432*h* are negative. Terminals 440*a*, 440*b*, . . . 440*h* are connected to a lead 442 which is connected to the first input terminal of a second summing amplifier 446. The second input terminal of amplifier 446 is connected to ground. The output terminals of amplifier 445 are connected to the input terminals of a recorder 397′. The output terminals of summing amplifier 446 are connected to the input terminals of a phase inverter circuit 447. The output terminals of phase inverter 447 are connected to the input terminals of recorder 397′. Phase inverter 447 provides an output signal which is 180° out of phase with the input signal applied thereto. This output signal is added to the output from amplifier 445**. The use of the inverter enables both positive and negative coefficients to be summed separately and the individual sums added together.

The contactors of potentiometers **433*a*, 433*b*, . . . 433*h* are connected through isolating resistors 450*a*, 450*b*, . . . 540*h* to respective switch blades 451*a*, 451*b*, . . . 451*h* engage respective terminals 452*a*, 452*b*, . . . 452*h* in first positions. Terminals 452*a*, 452*b*, . . . 452*h* are connected to a lead 454 which is connected to the first input terminal of a summing amplifier 457. Switch blades 451*a*, 451*b*, . . . 451*h* engage respective terminals 453*a*, 453*b*, . . . 453*h* in second positions. Terminals 453*a*, 453*b*, . . . 453*h* are connected to a lead 455 which is connected to the first input terminal of a summing amplifier 458. The output terminals of amplifier 458 are connected to the input terminals of a phase inverter circuit 459. The output terminals of phase inverter 459 are connected to the output terminals of summing amplifier 457 and to the input terminals of a second delay line 460. The output terminals of delay line 460 are connected to the input terminals of recorder 397′. The output signal from delay line 460 is delayed in phase by an interval equal to the delay in line 431 between output terminals 435*a* and 435*h***.

The contactors of potentiometers **434*a*, 434*b*, . . . 434*h* are connected through respective isolating resistors 461*a*, 461*b*, . . . 461*h* to respective switch blades 462*a*, 462*b*, . . . 462*h*. Switch blades 462*a*, 462*b*, . . . 462*h* engage respective terminals 463*a*, 463*b*, . . . 463*h* in first positions. Terminals 463*a*, 463*b*, . . . 463*h* are connected to a lead 465 which is connected to the first input terminal of a summing amplifier 467. Switch blades 462*a*, 462*b*, . . . 462*h* engage respective terminals 464*a*, 464*b*, . . . 464*h* in second positions. Terminals 464*a*, 464*b*, . . . 464*h* are connected to a lead 465 which is connected to the first input terminal of a summing amplifier 468. The output terminals of amplifier 468 are connected to the input terminals of a phase inverter circuit 469. The output terminals of phase inverter 469 are connected to the output terminals of summing amplifier 467 and to the input terminals of a third delay line 471. The output terminals of delay line 471 are connected to the input terminals of recorder 397′. Delay line 471 provides an output signal of phase which is delayed from the input signal applied thereto by twice the delay between terminals 435*a* and 435*h* of delay line 431**.

It should thus be apparent that the apparatus of Figure 22 operates in a manner corresponding to the apparatus of Figure 18. The delay lines, in effect, store signals for intervals corresponding to the storage by the rotating condensers. Additional parallel connected potentiometers and associated summing circuits can be added to the apparatus of Figure 22, if desired, in the manner described in conjunction with Figure 18.

From the foregoing description it can be seen that there is provided a novel method of and apparatus for multiplying and/or dividing algebraic polynomials. If the magnetic delay system, such as shown in Figure 3, is to be employed for purely mathematical operations, an interrupter may be incorporated in the output circuit to divide the output signal into individual values. The filter network would be eliminated. The two illustrative examples relating to the interpretation of seismic and well logging have been presented to show practical applications of the principles of this invention. However, it should readily be apparent to those skilled in the art that this invention is of value in many fields of measurement and computation and is by no means limited to the illustrated examples. While the invention has been described in conjunction with present preferred embodiments thereof it should be obvious that the invention is not limited thereto.

What is claimed is:

1. Apparatus for multiplying algebraic polynomials comprising, in combination, means for establishing an electrical signal, the amplitude of which varies with respect to time in accordance with the coefficients of one of the polynomials to be multiplied; a plurality of voltage multiplying means, one for each of the coefficients of the second of said polynomials, said voltage multiplying means being adapted to be set such that input signals applied thereto are multiplied by respective coefficients of said second polynomial; a plurality of electrical signal storage means, there being at least one of said storage means for each of said multiplying means; means for applying said electrical signal successively to said storage means whereby the first of said storage means receives the first portion of said signal and the remainder of said storage means receive portions of said signal which are at respective later times; means including voltage isolating means for connecting said plurality of storage means successively to said respective multiplying means whereby respective portions of said electrical signal are applied as input signals to said multiplying means; and means to sum the outputs of said multiplying means.

2. Apparatus for multiplying algebraic polynomials comprising, in combination, means for establishing an electrical signal, the amplitude of which varies with respect to time in accordance with the coefficients of one of the polynomials to be multiplied; a plurality of voltage multiplying means, one for each of the coefficients of the second of said polynomials, said voltage multiplying means being adapted to be set such that input signals applied thereto are multiplied by respective coefficients of said second polynomial; a plurality of electrical condensers, there being at least one of said condensers for each of said multiplying means, the respective first terminals of each of said condensers being connected to a point of reference potential; means for applying said electrical signal successively to the respective second terminals of said condensers whereby the first of said condensers receives the first portion of said signal and the remainder of said condensers receive portions of said signal which are at respective later times; means for connecting the second terminals of said condensers successively to said respective multiplying means whereby respective portions of said electrical signal are applied as input signals to said multiplying means; and means to sum the outputs of said multiplying means.

3. Apparatus for multiplying algebraic polynomials comprising, in combination, means for establishing an electrical signal, the amplitude of which varies with respect to time in accordance with the coefficients of one of the polynomials to be multiplied; a plurality of voltage multiplying means, one for each of the coefficients of the second of said polynomials, said voltage multiplying means being adapted to be set such that input signals applied thereto are multiplied by respective coefficients of said second polynomial; a plurality of sections of magnetizable material, there being at least one of said sections for each of said multiplying means; means for magnetizing said sections successively in accordance with the amplitude of said electrical signal whereby the first of said sections is magnetized by the first portion of said signal and the remainder of said sections are magnetized by portions of said signal which are at respective later times; means including amplifying means for applying voltages of magnitudes proportional to the degree of magnetization of said sections successively to said respective multiplying means whereby respective portions of said electrical signal are applied as input signals to said multiplying means; and means to sum the outputs of said multiplying means.

4. Apparatus for multiplying algebraic polynomials comprising, in combination, means for establishing an electrical signal, the amplitude of which varies with respect to time in accordance with the coefficients of one of the polynomials to be multiplied; a plurality of potentiometers, one for each of the coefficients of the second of said polynomials, the contactors of said potentiometers being adapted to be set in accordance with the respective coefficients of said second polynomial; a plurality of electrical signal storage means, there being at least one of said storage means for each of said potentiometers; means for applying said electrical signal successively to said storage means whereby the first of said storage means receives the first portion of said signal and the remainder of said storage means receive portions of said signal which are at respective later times; means including voltage isolating means for connecting said plurality of storage means successively across the end terminals of said potentiometers whereby respective portions of said electrical signal are applied as input signals across the end terminals of said respective potentiometers; and means to sum the voltages appearing between the contactors of said potentiometers and a point of reference potential.

5. Apparatus for multiplying algebraic polynomials comprising, in combination, means for establishing an electrical signal, the amplitude of which varies with respect to time in accordance with the coefficients of one of the polynomials to be multiplied; a plurality of amplifiers, one for each of the coefficients of the second of said polynomials; a plurality of potentiometers, the end terminals of each of said potentiometers being connected across the output terminals of respective ones of said amplifiers, the contactors of said potentiometers being adapted to be set in accordance with the respective coefficients of said second polynomial; a plurality of electrical signal storage means, there being at least one of said storage means for each of said potentiometers; means for applying said electrical signal successively to said storage means whereby the first of said storage means receives the first portion of said signal and the remainder of said storage means receive portions of said signal which are at respective later times; means for connecting said plurality of storage means successively to the input terminals of said amplifiers whereby respective portions of said electrical signal are applied as input signals across the end terminals of said respective potentiometers; and means to sum the voltages appearing between the contactors of said potentiometers and a point of reference potential.

6. The combination in accordance with claim 5 wherein each of said amplifiers comprises a vacuum tube having at least an anode, a cathode and a control grid, a source of direct voltage, a first resistor connected between the anode of said tube and the positive terminal of said voltage source, a second resistor connected between the cathode of said tube and the negative terminal of said voltage source, a first capacitor connected between the anode of said tube and one end terminal of the potentiometer associated with said amplifier, and a second capacitor connected between the cathode of said tube and the second end terminal of said potentiometer, the input terminals of said amplifier being connected to the cathode and control grid thereof, respectively.

7. The combination in accordance with claim 5 wherein each of said amplifiers comprises a first vacuum tube having at least an anode, a cathode and a control grid; a second vacuum tube having at least an anode, a cathode and a control grid; a source of direct voltage having the positive terminal thereof connected to the anodes of said first and second tubes; a first resistor connected between the cathode of said first tube and the negative terminal of said voltage source; and a second resistor connected between the cathode of said second tube and the negative terminal of said voltage source, the input terminals of said amplifier being connected to the respective control grids of said first and second tubes, the end terminals of the potentiometer associated with said amplifier being connected to the respective cathodes of said first and second tubes.

8. The combination in accordance with claim 5 wherein each of said amplifiers comprises a first vacuum tube having at least an anode, a cathode and a control grid; a second vacuum tube having at least an anode, a cathode and a control grid; a first resistor connected between a point of reference potential and the cathodes of said first and second tubes, the control grid of said second tube being connected to said point of reference potential; a source of direct voltage having the negative terminal thereof connected to said point of reference potential; a second resistor connected between the anode of said first tube and the positive terminal of said voltage source; and a third resistor connected between the anode of said second tube and the positive terminal of said voltage source, one input terminal of said amplifier being connected to the control grid of said first tube, the second input terminal of said amplifier being connected to said point of reference potential, the end terminals of the potentiometer associated with said amplifier being connected to the respective anodes of said first and second tubes.

9. Computing apparatus comprising, in combination, a plurality of voltage multiplying means, a plurality of electrical signal storage means, means for applying an electrical signal which varies in amplitude with respect to time to said storage means successively whereby the first of said storage means receives the first portion of said signal and the remainder of said storage means receives portions of said signal which are at respective later times, means including voltage isolating means for connecting said plurality of storage means successively to said respective multiplying means whereby respective portions of said electrical signal are applied as input signals to said multiplying means, and means to sum the outputs of said multiplying means.

10. The combination in accordance with claim 9 wherein each of said storage means comprises an electrical condenser having one terminal thereof connected to a point of reference potential, respective portions of said signal being applied to the second terminal of said condenser.

11. The combination in accordance with claim 9 wherein each of said storage means comprises a body of magnetizable material, means for magnetizing said body in accordance with respective portions of said input signal, and means to establish an electrical signal in accordance with the degree of magnetization of said body.

12. Computing apparatus comprising, in combination, a body of magnetizable material, a recorder unit positioned adjacent said body of magnetizable material whereby electrical signals applied to said recorder unit result in the portion of said body adjacent said recorder unit being magnetized in accordance with the amplitude of signal applied to said recorder unit, means for applying electrical signals to said recorder unit, a plurality of pickup units positioned adjacent said body of magnetizable material whereby electrical signals are induced in said pickup units of amplitude proportional to the degree of magnetization of the portion of said body adjacent said pickup units, means for moving said body of magnetic material whereby individual portions thereof pass successively adjacent said recorder unit and said plurality of pickup units, a plurality of potentiometers, means including amplifying means for applying the electrical signals induced in said pickup units across the end terminals of respective ones of said potentiometers, and means for summing the potentials at the adjustable contactors of said potentiometers.

13. Computing apparatus comprising, in combination; a rotatable disc; a plurality of concentric annular strips of magnetizable material mounted on one face of said disc; a recorder unit positioned adjacent each of said strips of magnetizable material whereby electrical signals applied to said recorder units result in the portions of said strips adjacent said recorder units being magnetized in accordance with the amplitude of signals applied to said recorder units; means for applying electrical signals to said recorder units; an obliterative unit positioned adjacent each of said strips and adjacent respective ones of said recorder units; means for applying alternating potentials to said obliterative units to demagnetize the portion of said strips adjacent said units; a plurality of pickup units positioned adjacent each of said strips of magnetizable material in spaced relation in annular paths adjacent said disc whereby electrical signals are induced in said pickup units of amplitude proportional to the degree of magnetization of the portions of said strips adjacent said pickup units; means for rotating said disc whereby individual portions of said strips of magnetizable material pass successively adjacent respective recorder units, respective ones of said pickup units and respective ones of said obliterative units; a plurality of potentiometers associated with each of said strips of magnetizable material; means for applying the electrical signals induced in said pickup units across the end terminals of respective ones of said potentiometers; means for summing the potentials at the adjustable contactors of the potentiometers associated with each of said strips of magnetizable material; a multi-channel recorder; and means for applying said summed potentials to individual channels of said recorder.

14. Computing apparatus comprising, in combination, a plurality of electrical condensers, means connecting respective first terminals of said condensers to a point of reference potential, a plurality of commutator segments, means connecting the second terminals of said condensers to respective ones of said commutator segments, a recorder brush adapted to engage said commutator segments, means for applying electrical signals to said recorder brush, a plurality of pickup brushes adapted to engage said commutator segments, means for moving said plurality of commutator segments so that they engage said recorder brush and said plurality of pickup brushes successively, a plurality of potentiometers, means for applying potentials across the end terminals of said potentiometers which are proportional to the potentials appearing on said plurality of respective pickup brushes, and means for summing the potentials at the adjustable contactors of said potentiometers.

15. Computing apparatus comprising, in combination, a rotatable body of electrically insulating material, a plurality of commutator segments mounted thereon in spaced relation, a plurality of electrical condensers, means connecting respective first terminals of said condensers to a point of reference potential, means connecting the second terminals of said condensers to respective ones of said commutator segments, a recorder brush positioned to engage said commutator segments successively as said body is rotated, means for applying electrical signals to said recorder brush, a plurality of pickup brushes positioned to engage said commutator segments successively as said body is rotated, a plurality of potentiometers, means for applying potentials across the end terminals of said potentiometers which are proportional to the potentials appearing on said plurality of pickup brushes, and means for summing the potentials at the adjustable contactors of said potentiometers.

16. The combination in accordance with claim 15 further comprising an obliterative brush positioned between said recorder brush and one of said pickup brushes whereby said commutator segments engage said recorder brush, said plurality of pickup brushes and said obliterative brush in succession as said disc is rotated, said obliterative brush being maintained at a point of reference potential.

17. Computing apparatus comprising, in combination, a rotatable disc of electrically insulating material, a plurality of groups of commutator segments mounted in annular paths on said disc whereby the individual commutator segments of said groups are in respective annular paths, a plurality of groups of electrical condensers, means connecting respective first terminals of said condensers to a point of reference potential, means connecting the second terminals of said condensers to respective ones of said commutator segments, a plurality of recorder brushes, each of said brushes being adapted to engage the commutator segments of one of said plurality of groups, means for applying electrical signals to said recorder brushes, a plurality of groups of pickup brushes, the brushes in said groups being adapted to engage the commutator segments of respective ones and of said plurality of groups, means for rotating said disc whereby the commutator segments of each of said plurality of groups engage successively the recorder brush and the plurality of pickup brushes associated with said groups, a plurality of groups of potentiometers, means for applying potentials across the end terminals of said potentiometers which are proportional to the potentials appearing on respective ones of said pickup brushes, means for summing the potentials at the adjustable contactors of the potentiometers in each of said groups, a multi-channel recorder, and means for applying said summed potentials to the individual channels of said recorder.

18. Computing apparatus comprising, in combination, a plurality of electrical condensers, means connecting respective first terminals of said condensers to a point of reference potential, a plurality of commutator segments, a plurality of resistors, individual ones of said resistors connecting the second terminals of said condensers to respective ones of said commutator segments, a recorder brush adapted to engage said commutator segments, a plurality of pickup brushes adapted to engage said commutator segments, there being one-half as many pickup as commutator segments, means for moving said commutator segments so that they engage said recorder brush and said plurality of pickup brushes successively, said commutator segments being spaced sufficiently close to one another whereby said brushes bridge two adjacent segments as said segments move past said brushes, a plurality of potentiometers, means for applying potentials across the end terminals of said potentiometers which are proportional to the potentials appearing on said plurality of pickup brushes, and means for summing the potentials at the adjustable contactors of said potentiometers.

19. The combination in accordance with claim 18 further comprising an obliterative brush, said obliterative brush being positioned such that said commutator segments engage said recorder brush, said pickup brushes and said obliterative brush successively, said obliterative brush being maintained at a point of reference potential.

20. Computing apparatus comprising, in combination, a rotatable body of electrically insulating material, a plurality of commutator segments mounted thereon in spaced relation with one another, a plurality of condensers, the respective first terminals of said condensers being connected to one another, a plurality of resistors, individual ones of said resistors being connected between the second terminals of said condensers and respective ones of said commutator segments, a plurality of brushes positioned adjacent said rotatable body whereby said brushes engage said commutator segments as said body is rotated, the relative sizes and spacings of said commutator segments and brushes being such that each of said brushes bridges two adjacent segments as the segments are rotated past said brushes.

21. Computing apparatus comprising, in combination, a rotatable body of electrically insulating material, a plurality of first commutator segments mounted on one face of said body in spaced relation, a plurality of second commutator segments mounted on said one face of said body in spaced relation, a plurality of electrical condensers having respective first terminals thereof connected to one another, the second terminals of said condensers being connected to respective ones of said second commutator segments, a plurality of first resistors connected between respective pairs of said first and second commutator segments, a plurality of second resistors connected between respective ones of said first commutator segments and the connected first terminals of said condensers, a first brush positioned to engage said second commutator segments successively as said body is rotated, and a plurality of second brushes positioned to engage said first commutator segments successively as said body is rotated.

22. Computing apparatus comprising, in combination, a rotatable body of electrically insulating material, a plurality of first commutator segments mounted on one face of said body in spaced relation, a plurality of second commutator segments mounted on said one face of said body in spaced relation, a plurality of electrical condensers having respective first terminals thereof connected to a point of reference potential, the second terminals of said condensers being connected to respective ones said second commutator segments, a plurality of first resistors connected between respective pairs of said first and second commutator segments, a plurality of second resistors connected between respective ones of said first commutator segments and the connected first terminals of said condensers, a first brush positioned to engage said second commutator segments successively as said body is rotated, means for applying a potential to said first brush, a plurality of second brushes positioned to engage said first commutator segments successively as said body is rotated, a plurality of potentiometers, means for applying potentials across the end terminals of said potentiometers which are proportional to the potentials appearing on respective ones of said second brushes, and means to sum the voltages at the contactors of said potentiometers.

23. Computing apparatus comprising, in combination, a rotatable body of electrically insulating material, a plurality of first commutator segments mounted on one face of said body in spaced relation in a first annular path, a plurality of second commutator segments mounted on one face of said body in a second annular path concentric with said first path, a plurality of third commutator segments mounted on one face of said body in spaced relation in a third annular path concentric with said first path, a plurality of electrical condensers having respective first terminals thereof connected to one another, the second terminals of one-half of said condensers being connected to alternate ones of said first commutator segments in said first annular path, the second terminals of the second half of said condensers being connected to alternate ones of said second commutator segments in said second annular path, a plurality of first resistors, means connecting individual ones of said first resistors between said first commutator segments having said condensers connected thereto and alternate ones of said third commutator segments mounted in said third path, a plurality of second resistors connected between said second commutator segments having said condensers connected thereto and the second half of said alternate third commutator segments, a plurality of third resistors connected between individual ones of said third commutator segments and the common junction of the first terminals of the first condensers, a first brush positioned to engage said first commutator segments successively as said body is rotated, a second brush positioned to engage said second commutator segments successively as said body is rotated, and a plurality of third brushes positioned to engage said third commutator segments successively as said body is rotated.

24. Computing apparatus comprising, in combination, a rotatable body of electrically insulating material, a plurality of first commutator segments mounted on one face of said body in spaced relation in a first annular path, a plurality of second commutator segments mounted on one face of said body in a second annular path concentric with said first path, a plurality of third commutator segments mounted on one face of said body in spaced relation in a third annular path concentric with said first path, a plurality of electrical condensers having respective first terminals thereof connected to one another, the second terminals of one-half of said condensers being connected to alternate ones of said first commutator segments in said first annular path, the second terminals of the second half of said condensers being connected to alternate ones of said second commutator segments in said second annular path, a plurality of first resistors, means connecting individual ones of said first resistors between said first commutator segments having said condensers connected thereto and alternate ones of said third commutator segments mounted in said third path, a plurality of second resistors connected between said second commutator segments having said condensers connected thereto and the second half of said alternate third commutator segments, a plurality of third resistors connected between individual ones of said third commutator segments and the common junction of the first terminals of the first condensers, a first brush positioned to engage said first commutator segments successively as said body is rotated, a second brush positioned to engage said second commutator segments successively as said body is rotated, a plurality of third brushes positioned to engage said third commutator segments successively as said body is rotated, means connecting the first terminals of said condensers to a point of reference potential, means for rotating said body, means for applying an electrical signal to said first and second brushes, a plurality of potentiometers, means for applying potentials across the end terminals of said potentiometers which are proportional to the potentials on respective ones of said third brushes, and means for summing the potentials at the contactors of said potentiometers.

25. Apparatus for indicating the time of arrival of a predetermined vibration pattern at a seismometer comprising, in combination, a seismometer to convert vibrations into a corresponding electrical signal, the amplitude of which varies with respect to time in accordance with the vibrations received at said seismometer; an amplifier connected to the output of said seismometer; a plurality of voltage multiplying means, one for each of a predetermined number of amplitudes of said predetermined vibration pattern taken at equally spaced time intervals, said voltage multiplying means being adapted to be set such that input signals applied thereto are multiplied by the respective amplitudes of said predetermined vibration pattern; a plurality of electrical signal storage means, there being at least one of said storage means for each of said multiplying means; means for applying the output of said amplifier successively to said storage means whereby the first of said storage means receives the first portion of said amplifier output and the remainder of said storage means receive portions of said amplifier output at respective later times; means for connecting said plurality of storage means successively to said respective multiplying means whereby respective portions of said amplifier output are applied as input signals to said multiplying means; and means to sum the outputs of said multiplying means.

26. Apparatus for indicating the time of arrival of a predetermined vibration pattern at a seismometer comprising, in combination, a seismometer to convert vibrations into a corresponding electrical signal, the amplitude of which varies with respect to time in accordance with the vibrations received at said seismometer; an amplifier connected to the output of said seismometer; a plurality of voltage multiplying means, one for each of a predetermined number of amplitudes of said predetermined vibration pattern taken at equally spaced time intervals, said voltage multiplying means being adapted to be set such that input signals applied thereto are multiplied by the respective amplitudes of said predetermined vibration pattern; a plurality of electrical condensers, there being at least one of said condensers for each of said multiplying means, the respective first terminals of each of said condensers being connected to a point of reference potential; means for applying said electrical signal successively to the respective second terminals of said condensers whereby the first of said condensers receives the first portion of said signal and the remainder of said condensers receive portions of said signal which are at respective later times; means for connecting said second terminals of said plurality of condensers successively to said respective multiplying means whereby respective portions of said amplifier output are applied as input signals to said multiplying means; and means to sum the outputs of said multiplying means.

27. Apparatus for indicating the time of arrival of a predetermined vibration pattern at a seismometer comprising, in combination, a seismometer to convert vibrations into a corresponding electrical signal, the amplitude of which varies with respect to time in accordance with the vibrations received at said seismometer; an amplifier connected to the output of said seismometer; a plurality of voltage multiplying means, one for each of a predetermined number of amplitudes of said predetermined vibration pattern taken at equally spaced time intervals, said voltage multiplying means being set such that input signals applied thereto are multipled by the respective amplitudes of said predetermined vibration pattern; a plurality of sections of magnetizable material, there being at least one of said sections for each of said multiplying means; means for magnetizing said sections successively in accordance with the amplitude of said amplifier output whereby the first of said sections is magnetized by the first portion of said amplifier output and the remainder of said sections are magnetized by portions of said amplifier output which are at respective later times; means for applying voltages of magnitude proportional to the degree of magnetization of said sections successively to said multiplying means whereby respective portions of said amplifier output are applied as input signals to said multiplying means; and means to sum the outputs of said multiplying means.

28. Computing apparatus comprising, in combination, a plurality of electrical condensers, a voltage source of constant potential, means connecting respective first terminals of said condensers and said voltage source to a point of zero reference potential, a plurality of commutator segments, means connecting the second terminals of said condenser and the second terminal of said voltage source to respective ones of said commutator segments, a plurality of brushes adapted to engage said commutator segments, means for moving said commutator segments so that they engage said brushes in succession, a plurality of potentiometers, there being one less potentiometer than said brushes, means for applying potentials across the end terminals of said potentiometers which are proportional to the potentials appearing on respective ones of said plurality of brushes, one of said brushes not being connected to a potentiometer, means for summing the potentials at the adjustable contactors of said potentiometers, and means for applying the negative of said summed potential to said brush which is not connected to one of said potentiometers.

29. Computing apparatus comprising, in combination, a plurality of electrical condensers, a voltage source of constant potential, means connecting respective first terminals of said condensers and said voltage source to a point of zero reference potential, a plurality of commutator segments, means connecting the second terminals of said condenser and the second terminal of said voltage source to respective ones of said commutator segments, a plurality of brushes adapted to engage said commutator segments, means for moving said commutator segments so that they engage said brushes in succession, a plurality of potentiometers, there being one less potentiometer than said brushes, means for applying potentials across the end terminals of said potentiometers which are proportional to the potentials appearing on respective ones of said plurality of brushes, one of said brushes not being connected to a potentiometer, means for summing the potentials at the adjustable contactors of said potentiometer, means for applying the negative of said summed potential to said brush which is not connected to one of said potentiometers, a plurality of voltage multiplying means, a plurality of electrical signal storage means, means for applying said summed voltage as a signal to said storage means successively whereby the first of said storage means receives the first portion of said signal and the remainder of said storage means receive portions of said signal which are at respective later times, means for connecting said plurality of storage means successively to said respective multiplying means whereby respective portions of said electrical signal are applied as input signals to said multiplying means, and means to sum the outputs of said multiplying means.

30. Computing apparatus comprising, in combination, a plurality of first electrical condensers, a voltage source of constant potential, means connecting respective first terminals of said first condensers and said voltage source to a point of zero reference potential, a plurality of first commutator segments, means connecting the second terminals of said first condensers and the second terminal of said voltage source to respective ones of said first commutator segments, a plurality of first brushes adapted to engage said first commutator segments, means for moving said first commutator segments so that they engage said first brushes in succession, a plurality of first potentiometers, there being one less first potentiometer than said first brushes, means for applying potentials across the end terminals of said first potentiometers which are proportional to the potentials appearing on respective ones of said plurality of first brushes, one of said first brushes not being connected to a potentiometer, means for summing the potentials at the adjustable contactors of said first potentiometers, means for applying the negative of said summed potential to said first brush which is not connected to one of said first potentiometers, a plurality of second electrical condensers, means connecting respective first terminals of said second condensers to a point of reference potential, a plurality of second commutator segments, means connecting the second terminals of said second condensers to respective ones of said second commutator segments, a second brush adapted to engage said second commutator segments, means for applying said summed potential to said second brush, a plurality of third brushes adapted to engage said second commutator segments, means for moving said second commutator segments so that they engage said second brush and said plurality of third brushes successively, a plurality of second potentiometers, means for applying potentials across the end terminals of said second potentiometers which are proportional to the potentials appearing on said plurality of respective third brushes, and means for summing the potentials at the adjustable contactors of said second potentiometers.

31. Computing apparatus comprising, in combination, a rotatable body of electrically insulating material, a plurality of commutator segments mounted thereon in spaced relation with one another, a plurality of condensers, the respective first terminals of said condensers being connected to one another, there being one less of said condensers than said segments, and a voltage source having one terminal thereof connected to the first terminals of said condensers, the second end terminal of said voltage source being connected to the commutator segment not connected to one of said condensers.

32. Computing apparatus comprising, in combination, a rotatable body of electrically insulating material, a plurality of commutator segments mounted thereon in spaced relation with one another, a plurality of condensers, the respective first terminals of said condensers being connected to one another, there being one less of said condensers than said segments, a voltage source having one terminal thereof connected to the first terminals of said condensers, the second end terminal of said voltage source being connected to the commutator segment not connected to one of said condensers, a plurality of brushes positioned adjacent said body whereby said brushes engage said segments as said body is rotated, and means to rotate said body.

33. Computing apparatus comprising a plurality of electrical signal storage means, means to apply an electrical signal successively to said storage means, a plurality of first multiplying means, a plurality of second multiplying means, means to apply the signals stored by said storage means successively as inputs to said first and second multiplying means, means for summing the outputs of said first multiplying means, means for summing the outputs of said second multiplying means, signal adding means, means to apply the summed outputs of said first multiplying means to said adding means, signal delay means, means to apply the summed outputs of said second multiplying means to the input of signal delay means, and means to apply the output of said signal delay means to the input of said adding means.

34. The combination in accordance with claim 33 wherein said plurality of electrical signal storage means comprises a plurality of capacitors having corresponding first terminals connected to a reference potential; and wherein said means to apply an electrical signal to said storage means comprises a brush, and means to move said brush relative to said capacitors to engage the second terminals of said capacitors successively.

35. The combination in accordance with claim 33 wherein said plurality of electrical signal storage means comprises a member of magnetizable material; and wherein said means to apply an electrical signal to said signal storage means comprises a recording head adjacent said member to magnetize said member in accordance with the amplitude of the signal applied thereto, and means to move said recording head relative to said member to magnetize adjacent sections of said member successively.

36. The combination in accordance with claim 33 wherein said plurality of electrical signal storage means comprises an electrical delay line having a plurality of spaced tapped output terminals thereon.

37. The combination in accordance with claim 33 wherein each of said multiplying means comprises a potentiometer, the end terminals of each of said potentiometers representing the input terminals of corresponding ones of said multiplying means, and the contactors and first end terminals of said potentiometers representing the output terminals of corresponding ones of said multiplying means.

38. The combination in accordance with claim 33 further comprising a plurality of third multiplying means, said means to apply the signals stored by said storage means successively to said first and second multiplying means also applying said stored signals successively to said plurality of third multiplying means, means for summing the outputs of said third multiplying means, and means for adding the summed output of said third multiplying means to the summed output of said first multiplying means following a predetermined time interval which is greater than said first-mentioned time interval.

39. Computing apparatus comprising a first rotatable element having a plurality of first capacitors thereon, means connecting corresponding first terminals of said first capacitors to a reference potential, a plurality of first equally spaced commutator segments on said first element, the second terminals of said first capacitors being connected to respective ones of said first segments, a plurality of first equally spaced brushes positioned adjacent said first element, means to rotate said first element so that said first segments engage said first brushes sequentially, a plurality of amplifiers, means connecting all but one of said first brushes to a first input terminal of a respective one of said amplifiers, the second input terminals of said amplifiers being connected to said reference potential, a plurality of first potentiometers having the end terminals thereof connected to the output terminals of respective ones of said amplifiers, a plurality of second potentiometers connected in parallel with respective ones of said first potentiometers, a second rotatable element having a plurality of second capacitors thereon, means connecting corresponding first terminals of said second capacitors to said reference potential, a plurality of second equally spaced commutator segments on said second element, the second end terminals of said second capacitors being connected to respective ones of said second segments, second and third spaced brushes positioned adjacent said second element, means to rotate said second element relative to said first element so that one of said second segments moves from said second brush to said third brush during the time one of said first segments moves from the first of said first brushes to the last of said first brushes, means to sum the voltages appearing at the contactors of said first potentiometers to form a first summed voltage, means to sum the voltages appearing at the contactors of said second potentiometers to form a second summed voltage, means to apply said second summed voltage to said second brush, and means to sum said first summed voltage and the voltage appearing at said third brush.

40. The combination in accordance with claim 39 wherein each of said first and second potentiometers has a center tap connected to said reference potential.

41. The combination in accordance with claim 39 further comprising a plurality of third potentiometers connected in parallel with respective ones of said first potentiometers, a third rotatable element having a plurality of third capacitors thereon, means connecting corresponding first terminals of said third capacitors to said reference potential, a plurality of third equally spaced commutator segments on said third element, the second end terminals of said third capacitors being connected to respective ones of said third segments, fourth and fifth spaced brushes positioned adjacent said third element, means to rotate said third element relative to said first element so that one of said segments moves from said fourth brush to said fifth brush during the time one of said first segments moves from the first of said first brushes to the last of said first brushes, means to sum the voltages appearing at the contactors of said third potentiometers to form a third summed voltage, means to apply said third summed voltage to said fourth brush, and means to sum said first summed voltage and the voltage appearing at said fifth brush.

42. The combination in accordance with claim 39 further comprising a plurality of third potentiometers connected in parallel with respective ones of said first potentiometers, a third rotatable element having a plurality of third capacitors thereon, means connecting corresponding first terminals of said third capacitors to said reference potential, a plurality of third equally spaced commutator segments on said third element, the second end terminals of said third capacitors being connected to respective ones of said third segments, fourth and fifth spaced brushes positioned adjacent said third element, means to rotate said third element relative to said first element so that one of said third segments moves from said fourth brush to said fifth brush during the time one of said first segments moves from the first of said first brushes to the last of said first brushes, a fourth rotatable element having a plurality of fourth capacitors thereon, means connecting corresponding first terminals of said fourth capacitors to said reference potential, a plurality of fourth equally spaced commutator segments on said fourth element, the second end terminals of said fourth capacitors being connected to respective ones of said fourth segments, sixth and seventh spaced brushes positioned adjacent said fourth element, means to rotate said fourth element relative to said first element so that one of said fourth segments moves from said sixth brush to said seventh brush during the time one of said first segments moves from the first of said first brushes to the last of said brushes, means connecting said fifth brush to said sixth brush, means to sum the voltages appearing at the contactors of said third potentiometers to form a third summed voltage, means to apply said third summed voltage to said fourth brush, and means to sum said first summed voltage with the voltage appearing at said seventh brush.

43. Computing apparatus comprising a first rotatable element having a first segment of magnetizable material thereon; a recording head positioned adjacent said first segment; a plurality of equally spaced pickup heads positioned adjacent said first segment; an obliterating unit positioned between said recording head and the last of said pickup heads; means to rotate said first element so that each portion of said first segment moves adjacent said recording head, said pickup heads, and said obliterating unit; a plurality of amplifiers; means connecting said pickup heads to the input terminals of respective ones of said amplifiers; a plurality of first potentiometers having the end terminals thereof connected to the output terminals of respective ones of said amplifiers; a plurality of second potentiometers connected in parallel with respective ones of said first potentiometers; a second rotatable element having a second segment of magnetizable material thereon; a second recording head and a second pickup head mounted in spaced relation with one another adjacent said second segment; a second obliterating unit positioned between said second recording head and said second pickup head; means to rotate said second element relative to said first element so that a portion of said second segment moves from said second recording head to said second pickup head during the time a portion of said first segment moves from said first-mentioned recording head to the last of said first-mentioned pickup heads; means to sum the voltages appearing at the contactors of said first potentiometers to form a first summed voltage; means to sum the voltages appearing at the contactors of said second potentiometers to form a second summed voltage; means to apply said second summed voltage to said second recording head; and means to sum the voltage induced in said second pickup head with said first summed voltage.

44. Computing apparatus comprising a first electrical delay line having a plurality of spaced tapped output terminals thereon, a plurality of first potentiometers having first end terminals thereof connected to respective ones of said output terminals, a plurality of second potentiometers connected in parallel with respective ones of said first potentiometers, means connecting the second end terminals of said first and second potentiometers to a reference potential, means to sum the voltages appearing at the contactors of said first potentiometers to form a first summed voltage, a second electrical delay line, means to sum the voltages appearing at the contactors of said second potentiometers to form a second summed voltage, means to apply said second summed voltage to the input of said second delay line, and means to sum the output voltage of said second delay line and said first summed voltage.

45. The combination in accordance with claim 44 further comprising a plurality of third potentiometers connected in parallel with respective ones of said first potentiometers, means to sum the voltages appearing at the contactors of said third potentiometers to form a third summed voltage, a third electrical delay line, means to apply said third summed voltage to the input of said third delay line, and means to sum the output voltage of said third delay line and said first summed voltage.

46. Computing apparatus comprising a first electrical delay line having a plurality of spaced tapped output terminals thereon, a plurality of first potentiometers having first end terminals thereof connected to respective ones of said output terminals, a plurality of second potentiometers connected in parallel with respective ones of said first potentiometers, means connecting the second end terminals of said first and second potentiometers to a reference potential, first and second summing amplifiers, switching means to connect the contactors of said first potentiometers selectively to first input terminals of said first and second amplifiers, the second input terminals of said first and second amplifiers being connected to said reference potential, a phase inverter connected to the output of said second amplifier, means to sum the outputs of said first amplifier and said phase inverter, third and fourth summing amplifiers, switching means to connect the contactors of said second potentiometers selectively to first input terminals of said third and fourth summing amplifiers, the second input terminals of said third and fourth amplifiers being connected to said reference potential, a second electrical delay line, a second phase inverter connected to the output of said fourth amplifier, means to sum the outputs of said third amplifier and said second inverter and to apply such sum to the input of said second delay line, and means to sum the output of said second delay line with said first-mentioned sum.

47. The combination in accordance with claim 46 further comprising a plurality of third potentiometers connected in parallel with respective ones of said first potentiometers, fifth and sixth summing amplifiers, switching means to connect the contactors of said third potentiometers selectively to first input terminals of said fifth and sixth amplifiers, a third electrical delay line, a third phase inverter connected to the output of said sixth amplifier, means to sum the output of said fifth amplifier and said third inverter and to apply such sum to the input of said third delay line, and means to sum the output of said third delay line and said first-mentioned sum.

48. Seismic signal interpreting apparatus comprising a seismometer to provide an electrical signal, the amplitude of which is representative of the amplitude of vibrations incident upon said seismometer, a plurality of electrical signal storage means, means to apply the output of said seismometer successively to said storage means, a plurality of first multiplying means, a plurality of second multiplying means, means to apply the signals stored by said storage means successively as inputs to said first and second multiplying means, means for summing the outputs of said first multiplying means, means for summing the outputs of said second multiplying means, signal adding means, means to apply the summed outputs of said first multiplying means to said adding means, signal delay means, means to apply the summed outputs of said second multiplying means to the input of signal delay means, and means to apply the output of said signal delay means to the input of said adding means.

References Cited in the file of this patent

UNITED STATES PATENTS

| | | |
|---|---|---|
| 2,200,478 | Mounce | May 14, 1940 |
| 2,253,975 | Guanella | Aug. 26, 1941 |
| 2,374,204 | Hoover | Apr. 24, 1945 |
| 2,386,892 | Hadfield | Oct. 16, 1945 |
| 2,441,334 | Sayer | May 11, 1948 |
| 2,493,534 | Hawkins | Jan. 3, 1950 |
| 2,506,149 | Herzog | May 2, 1950 |
| 2,631,199 | Maron | Mar. 10, 1953 |
| 2,638,268 | Redheffer | May 12, 1953 |
| 2,678,163 | Roberts et al. | May 11, 1954 |
| 2,688,124 | Doty et al. | Aug. 31, 1954 |
| 2,752,092 | McDonald | June 26, 1956 |
| 2,794,965 | Yost | June 4, 1957 |
| 2,801,351 | Calvert et al. | July 30, 1957 |

FOREIGN PATENTS

| | | |
|---|---|---|
| 492,407 | Great Britain | Sept. 20, 1938 |